United States Patent
Bentovim et al.

(10) Patent No.: US 11,095,947 B2
(45) Date of Patent: Aug. 17, 2021

(54) SYSTEM FOR SHARING USER-GENERATED CONTENT

(71) Applicant: NUMBER 9, LLC, New York, NY (US)

(72) Inventors: Lyron L. Bentovim, Demarest, NJ (US); Rodney Joseph Recker, Shelton, CT (US); James Joseph Giliberti, San Francisco, CA (US)

(73) Assignee: Number 9, LLC, New York, NY (US)

( * ) Notice: Subject to any disclaimer, the term of this patent is extended or adjusted under 35 U.S.C. 154(b) by 0 days.

(21) Appl. No.: 16/439,280

(22) Filed: Jun. 12, 2019

(65) Prior Publication Data

US 2019/0379940 A1     Dec. 12, 2019

Related U.S. Application Data

(60) Provisional application No. 62/684,022, filed on Jun. 12, 2018.

(51) Int. Cl.
*H04N 21/472* (2011.01)
*H04N 21/239* (2011.01)
*H04N 21/2187* (2011.01)

(52) U.S. Cl.
CPC ....... *H04N 21/472* (2013.01); *H04N 21/2187* (2013.01); *H04N 21/2396* (2013.01)

(58) Field of Classification Search
CPC ............. H04N 21/472; H04N 21/2187; H04N 21/2396
See application file for complete search history.

(56) References Cited

U.S. PATENT DOCUMENTS

| | | | | |
|---|---|---|---|---|
| 9,818,228 | B2* | 11/2017 | Lanier | H04W 12/02 |
| 10,264,215 | B1* | 4/2019 | Sadanand | H04N 7/147 |
| 10,445,941 | B2 | 10/2019 | Niles | |
| 2011/0238751 | A1* | 9/2011 | Belimpasakis | G06F 3/011 |
| | | | | 709/204 |
| 2012/0154619 | A1* | 6/2012 | Lee | G06F 3/147 |
| | | | | 348/222.1 |
| 2013/0162644 | A1* | 6/2013 | Velkavrh | G06T 17/20 |
| | | | | 345/423 |
| 2013/0339864 | A1* | 12/2013 | Uusitalo | H04W 48/18 |
| | | | | 715/736 |
| 2014/0240444 | A1* | 8/2014 | Szymczyk | H04N 7/157 |
| | | | | 348/14.07 |

(Continued)

*Primary Examiner* — Blake J Rubin
(74) *Attorney, Agent, or Firm* — Fox Rothschild LLP

(57) ABSTRACT

A system for sharing user-generated content includes a plurality of video recording devices, a viewer device, and a processor. The plurality of video recording devices include cameras capable of capturing video. The recording devices are connected to a network for streaming the video onto the network and transmitting information about the video recording devices related to the streaming video. The viewer device is configured for receiving the streamed video from the network and displaying content based on the streamed video. The viewer device has a viewer-user interface, which can receive viewer-user input. The processor is configured for receiving the information and viewer-user input and selecting one or more videos to stream based on the information that is associated with the viewer-user input. The processors stream the selected videos to the viewer device.

16 Claims, 12 Drawing Sheets

(56) References Cited

U.S. PATENT DOCUMENTS

| | | | | |
|---|---|---|---|---|
| 2014/0245463 | A1* | 8/2014 | Suryanarayanan | G06F 21/31 726/28 |
| 2014/0253743 | A1* | 9/2014 | Loxam | G06T 11/00 348/207.1 |
| 2014/0279790 | A1* | 9/2014 | Ramachandran | G06K 9/00993 706/46 |
| 2014/0347265 | A1* | 11/2014 | Aimone | A61M 21/00 345/156 |
| 2015/0317836 | A1* | 11/2015 | Beaurepaire | G06F 3/005 345/634 |
| 2016/0292966 | A1* | 10/2016 | Denham | G06Q 30/0643 |
| 2017/0262154 | A1* | 9/2017 | Black | G02B 27/0093 |
| 2017/0358138 | A1* | 12/2017 | Dack | G06F 3/011 |
| 2018/0040161 | A1* | 2/2018 | Tierney | G06F 3/015 |
| 2018/0061132 | A1* | 3/2018 | Lanier | G02B 27/017 |
| 2018/0089898 | A1* | 3/2018 | Huddy | H04L 67/18 |
| 2018/0107839 | A1* | 4/2018 | Clement | G06F 3/1454 |
| 2018/0123813 | A1* | 5/2018 | Milevski | H04L 12/1827 |
| 2018/0227974 | A1* | 8/2018 | Puttagunta | H04W 8/005 |
| 2018/0322674 | A1* | 11/2018 | Du | G06K 9/6267 |
| 2018/0323972 | A1* | 11/2018 | Reed | G06Q 20/3674 |
| 2018/0341811 | A1* | 11/2018 | Bendale | G06K 9/3233 |
| 2018/0342106 | A1* | 11/2018 | Rosado | A63F 13/86 |
| 2018/0350144 | A1* | 12/2018 | Rathod | G06Q 20/3276 |
| 2019/0004325 | A1* | 1/2019 | Connor | G02B 27/0172 |
| 2019/0073832 | A1* | 3/2019 | Kim | G06F 40/221 |
| 2019/0108578 | A1* | 4/2019 | Spivack | G09G 5/14 |
| 2019/0108682 | A1* | 4/2019 | Spivack | G06Q 30/0273 |
| 2019/0130655 | A1* | 5/2019 | Gupta | H04N 21/4126 |
| 2019/0166303 | A1* | 5/2019 | Qin | H04N 21/21805 |
| 2019/0197785 | A1* | 6/2019 | Tate-Gans | G06T 19/006 |
| 2019/0228448 | A1* | 7/2019 | Bleicher | G06Q 30/0621 |
| 2019/0236631 | A1* | 8/2019 | Schwartz | H04W 4/20 |
| 2019/0287306 | A1* | 9/2019 | Wieser | G06T 17/20 |
| 2020/0066054 | A1* | 2/2020 | Yin | G06K 9/3216 |
| 2020/0286161 | A1* | 9/2020 | Marguello | G06T 19/006 |
| 2021/0074068 | A1* | 3/2021 | Spivack | G06T 19/006 |

\* cited by examiner

SYSTEM FOR SHARING USER-GENERATED CONTENT

CROSS-REFERENCE TO RELATED APPLICATIONS

The present application is a Non-Provisional of U.S. Provisional Patent Application No. 62/684,022, filed Jun. 12, 2018, entitled System for Sharing User-Generated Content, which is incorporated herein by reference in its entirety.

TECHNICAL FIELD

The present disclosure relates generally to a system for sharing user-generated content, such as user-recorded videos, and/or enhancing the content provided by a given platform (e.g., the content-sharing platform, a merchant's website, or a social media site) by information extracted from the user-generated content.

BACKGROUND

Websites such as YouTube and Periscope allow viewers to find and watch user-generated content. These sites typically include features such as a user profile associated with the video content uploaded by the user, and the videos include a title and description below, with space for comments and ratings. 2D-video content can be uploaded via a live stream to the websites for users to watch.

SUMMARY

Embodiments disclosed pertain to a system for sharing user-generated content, such as user-recorded videos, and/or enhancing the content provided by a given platform (e.g., the content-sharing platform, a merchant's website, or a social media site) by information extracted from the user-generated content An example system for sharing user-generated content may include a plurality of video recording devices, each of the plurality of video recording devices including a camera capable of capturing video, and each of the plurality of video recording devices being connected to a network for streaming the video onto the network. The plurality of video recording devices may each be further configured to transmit information about the video recording device or related to the streaming video to the network. The system may also include a viewer device configured to receive from the network and display content based, at least in part, on the streaming video, the viewer device having a viewer-user interface for receiving viewer-user input, and a processor configured to receive the information and the viewer-user input and to select at least one video from the streaming videos for generating the content for the viewer device. The content for the viewer device may be further based on the information and the viewer-user input. In some embodiments, the content may be the streaming video itself, a composite video generated from a plurality of user-acquired videos or based on information or features extracted from one or more user-acquired videos, or a combination (e.g., a VR/MR content) that combines user-acquired content (e.g., video) and information extracted from the user-acquired content.

In some embodiments, the system may be configured to relay instructions from a viewer device to a recording device, and in some cases live, while the recording device is capturing the content (e.g., video). For example, a processor of the content-sharing system may receive input from a viewer device and if the interaction permissions so allow, transmit instructions to the recording device. Different types of interactions may be enabled in this manner, such as the viewer device sending comments, request or commands to the recording device, for example to change a viewing angle of the camera, increase or decrease a zoom of the camera, etc.

In some embodiments, the processor may be configured to stream a user-recorded video to a viewer device in real time (e.g., live, during the recording of the video) which may in effect present a virtual reality environment on the viewer device to enable the viewer user to immerse themselves in the same location or event as the recording user. In some embodiment, the system may further comprise a context database configured to store data associated with a plurality of objects, and the processor may be further configured to analyze the streaming video to detect at least one of the objects therein, retrieve data associated with the detected objects, and enrich the virtual environment by displaying the data adjacent to the detected objects in the streaming videos.

In some embodiments, a content-sharing system may include a database, which stores a plurality of user profiles, each associated with a respective recorder user and defining an interaction profile for the respective recorder user, and a computing device communicatively coupled to the database and including a processor and memory comprising executable instructions. When executed by the processor, the instruction may configure the processor to receive video from a video recording device associated with at least one of the plurality of recorder users, retrieve the interaction profile of the at least one recorder user, tag the video as either sharable or non-sharable based on the interaction profile of the at least one recorder user, receive viewer user input providing information about desired content, determine, using the information, whether the video contain matching content that corresponds to the desired content, and if the video is tagged as sharable, provide the matching content to the viewer user. In some embodiments, the processor may be configured to log usage of sharable content and may communicate the usage data, via an interface, to a billing system e.g., for monetizing the sharable content.

A method for sharing content may involve streaming video from a first recording device to a content-sharing network while recording the video with the first recording device, and tagging the video as either sharable or non-sharable based on content-sharing permissions associated with the first recording device. The method may further involve, determining whether interaction is permitted with the first recording device based on the content-sharing permissions associated with the first recording device. If the if the video is tagged as sharable, the method may involve providing the video to a viewer user of the content-sharing network, and if interaction with the first recording device is permitted, the method may also involve transmitting instructions from the viewer device to the first recording device, while recording the video. The method may further involve logging usage of sharable content and in some embodiments, interfacing with a system that uses the logged usage for additional tasks, such as a reporting, billing, forecasting, marketing, etc.

Features from any of the disclosed embodiments may be used in combination with one another, without limitation. In addition, other features and advantages of the present disclosure will become apparent to those of ordinary skill in the art through consideration of the following detailed description and the accompanying drawings.

DETAILED DESCRIPTION

Figure 1:
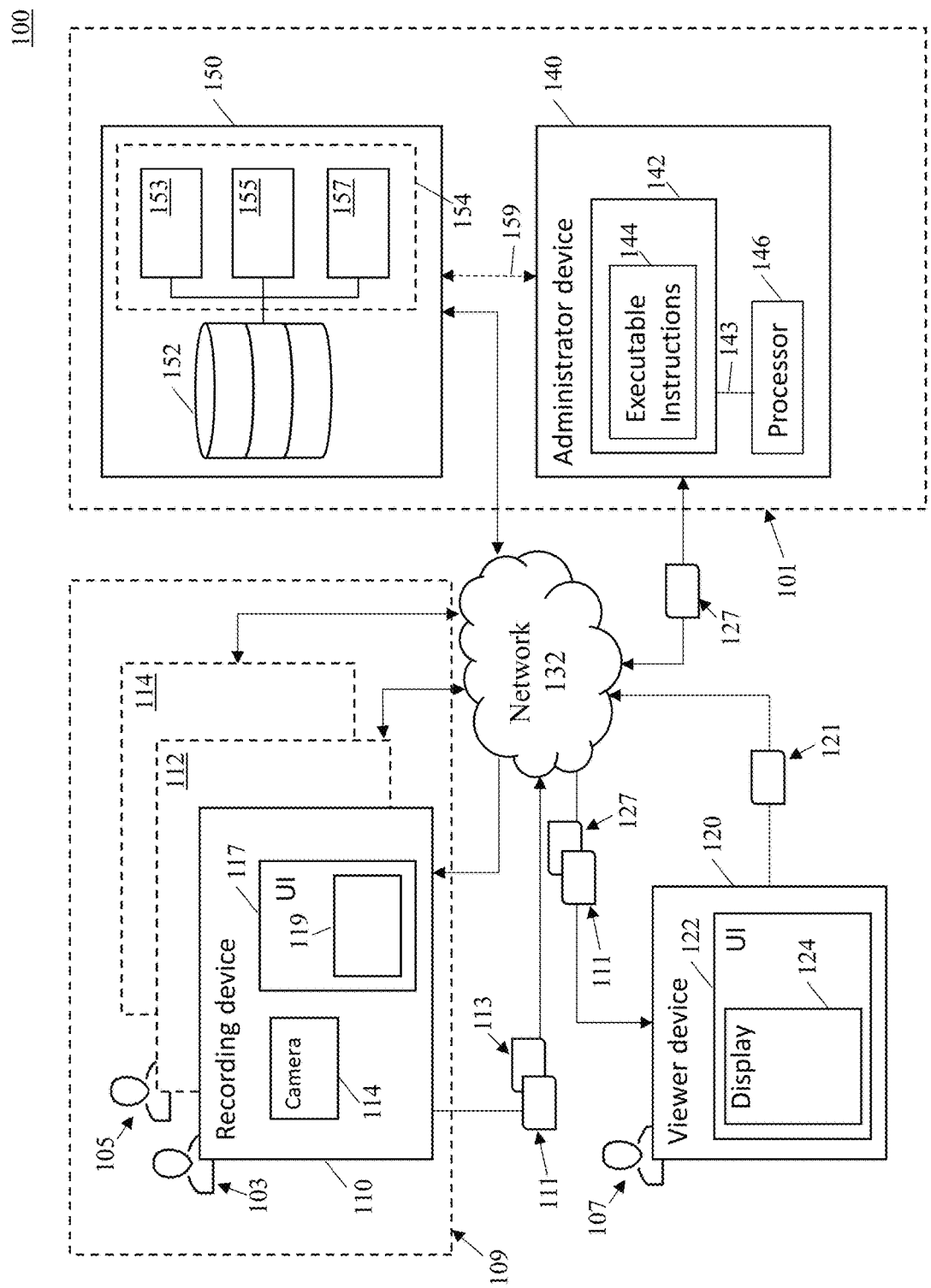
FIG. 1 is a block diagram of a system in accordance with some examples of the present disclosure.

In accordance with principles of the present disclosure, a system for sharing user-acquired content, also referred to as user-generated content, and in some examples for creating additional content, such as a virtual environment based at least in part on the user-generated content, is described. Systems according to some embodiments herein may enable one user, referred to here as content-consumer or viewer, to receive content based at least in part on user-acquired content by one or more other users, referred to herein as content-producer or recorder. The consumption of content by the viewer may be live (e.g., in real or near real time meaning that the content consumption occurs while the recorder is acquiring the content, for example recording a video). By enabling the content-consumer to view live content (i.e., while the content is being recorded), the system may in essence enable the viewer to tap into a live feed (e.g., a video stream) of another user (the content-producer) and thus become virtually immersed in the same location, activity and/or experience of the content-producer.

The sharing of content may be controlled, in some cases, by content-sharing permission(s), which may be stored in user profiles, e.g., in a database maintained by the content-sharing system. A variety of content-sharing permission may be included in a given user's profile, such as permissions, which control whether the recorder user is willing to interact with a viewer user, specific times, locations, or instances otherwise defined during which the recorder user is willing to share content and/or interact with a viewer. In one example, a content-sharing permission may be forward looking in that a recorder user may specify that he would be at a given location (or participating in a given event or activity) and willing to share his content at that future time. A viewer may be able to search for content in the content-sharing system by any suitable parameter (e.g., location, time, event, activity, or other search parameter) and be able to tap into content shared by a recorder viewer that matches the viewer's search parameters. In yet further examples, the content-sharing system, may, additionally or alternatively, analyze the content provided into the system by one or more recorders to identify information, which can then be used to enhance system-generated content (e.g., virtual reality content) or the content of other platforms (e.g., the recorder content or information extracted therefrom may be presented via a merchant's website, or content or information may be provided to one or more social networks).

In examples, a recorder may be any person operating a video recording device and providing the user-generated content (e.g., recorded video) to the network-connected data storage device. The viewer device may be associated with a content consumer (or viewer). The viewer may be granted access, by a system administrator, to user-generated content. The user-generated content may be stored in one or more networked data storage devices of the content-sharing system. The user-generated content may be stored in the data storage device(s) and accessed, in near real-time or live as it is streamed from the recording device, by a viewer device, or at a later time after the event being recorded has ended or any recording associated with the event was completed and/or a full video uploaded to the content-sharing network. In some examples, user interaction tools may be provided by the content-sharing system to enable the viewer to interact or control the content generation by the content producer. With the proliferation of social media platforms and the availability of affordable portable and wearable video recording device, the use of video recording devices in daily life and thus the amount of user-generated content has skyrocketed in recent years. As will be described in more details below, embodiment of the present disclosure enables the sharing of user-generated content in a manner that may be meaningful and rewarding to all parties (e.g., the content generator and content consumer).

FIG. 1 shows a system 100 for sharing user-acquired content in accordance with examples of the present disclosure. The components and arrangement thereof in FIG. 1 are exemplary only and variations, such as adding, removing, or combining components, are envisioned.

As shown in the example in FIG. 1, the system 100 may include at least one, and typically a plurality, of recording devices 110, 112, and 114. The recording devices (e.g., 110, 112, and 114) are communicatively connected to a processor 146 and at least one viewer device 120 via a communication network 132 to form a content-sharing network. As further shown in FIG. 1, a recording device (e.g., 110, 112, and/or 114) of system 100 may include a camera 114, and in some examples optionally a user interface 117. The user interface 117 may include a display or another type of output or feedback device 119 configured to provide instructions to the recorder 103, as described further below. Each of the recording devices 110, 112, and 114 may be connected to the network 132 for streaming recorded content 111 (e.g., recorded video) thereon, which content may be provided to another user 107 of the system 110, also referred to herein as viewer 107. In some examples, the user-acquired content may be provided to the viewer in real time. In other examples, the user-acquired content may instead be initially stored and provided to the viewer at a later time. That is, content sharing need not necessarily be live (as the content is being acquired). Stored user-acquired content may alternatively or additionally be used to enhance other content, such as content generated by the system (e.g., virtual reality environment) or content provided by other systems, such as a merchant's website. For example, a restaurant may maintain a website, which provides photos (e.g., interior, exterior) of the restaurant, e.g., thus familiarizing a potential customer with the ambiance, and/or which provides current menu(s). Instead of the restaurant owner having to update content on the website (e.g., pictures, menu), information extracted from recorder user content (e.g., a picture or video from a recorder who visits the restaurant) may be used to update the restaurant's website. As can be appreciated, multitude of other examples for enhancing content of other platforms in view of the examples herein can be envisioned and are within the scope of the present disclosure. In some examples, the user-acquired content 111 may be used by the system 100 to create additional content 127, such as content associated with a virtual reality, mixed reality, or augmented reality environment created by the system 100, collectively referred to as virtual reality content, or such as search results or other information (e.g., traffic information, pricing, product availability, menus, etc.), collectively referred to as interpreted content. The interpreted content may be extracted or derived from the user-acquired content 111. In some examples, the user-acquired content 111 (e.g., a user video) may be interpreted to determine information from the video (e.g., product information, pricing, etc.) and this information may then be provided to virtually any other platform, such as a web-based search engine or other website. In some examples, the interpreted information may be derived from multiple user-acquired content files (e.g., from two different videos received from the same or two different recording devices) and/or in some cases, further based on the information 113 (e.g., location information, time of day, etc.) received with user-acquired content files.

The recording device 110 may be any type of electronic device, which is capable of capturing audio and/or video. For example, the recording device 110 may be any type of portable electronic device that includes a camera for capturing video, for example a smart phone, a tablet, or other mobile computing or communication device, a virtual reality (VR), augmented reality (AR), or mixed reality (MR) device such as a VR, AR, or MR headset or glasses, and/or any other portable, hand-held, or wearable audio/video recording devices (e.g., a wearable camera such as a camera integrated into or connected to eyewear or other headgear). The recording device 110 may be associated with a user 103 (interchangeably referred to as recorder 103) who generates content 111 for the system 100. For example user 103 may participate in a real-life event or activity while operating the recording device 110, such as attending a concert, theater performance, sporting event, a lecture, a speech or rally, travelling to a destination, eating dinner at a restaurant or simply walking along a street, driving, or otherwise exploring a real-life location, thereby the user 103 may record video of whatever the user sees while performing the given activity. The user-acquired content 111 (e.g., recorded video) may be shared over the network 132 with one or more other users (e.g., user 107, also referred to herein as viewer 107), and/or may be used to generate other content 117 for consumption by the viewer 107. To that end, the recording device 110 may include, or be operatively associated with a wireless communication interface (e.g., using Wi-Fi, satellite including but not limited to GSM, 3G, 4G/LTE, radio frequency (RF), or any other suitable communication protocol) for transmitting (e.g., streaming) recorder user data including user-acquired content 111 (e.g., recorded videos) to the network 132.

In some examples, each individual recording device may be associated with a different user. In other examples, a given recorder (e.g., recorder 105) may be associated (e.g., operate) multiple recording devices, for example recording devices 112 and 114, which may be two different wearable cameras arranged to provide two different fields of view. In yet further examples, a recording device (e.g., 114) may not be associated with a user or operated directly by a user (with the user participating in the real-life event) but may instead be a recording device mounted on a drone, car, plane, or other moving base, which may be operated remotely or via automated control. In some examples, the recording device may be a stationary recording device, for example a camera attached to a stationary location such as a building or telephone pole. In some examples, video may be received from a camera maintained by a public agency (e.g., a traffic enforcement camera, a CCTV camera, or other mass surveillance device), or by a private entity (e.g., an owner of a venue, such as a theater, concert hall, sport stadium, etc.). In yet other examples, one or more of the recording devices may be configured to capture audio only (e.g., audio at a lecture, a speech or a rally). As will be appreciated, a wide variety of content may be recorded by a multitude of real-life participants of the system 100 (e.g., recorders 103, 105, etc.) and the recorded content may be used in a variety of ways, examples of which will be described further below.

One or more of the recording devices 110, 112, and 114 may be operatively associated with a location tracking system 109, for example a geolocation system such as GPS. The location tracking system 109 may enable the system to track the location (e.g., geographic coordinates and/or a direction in which the camera is aimed while recording the video) of the individual recording device(s) 110, 112, 114. A recording device 110 may transmit, along with any recorded content 111, information 113 about the content and/or device 110. The information 113 may include location information (e.g., the geographic coordinates and viewing direction of the camera), date and time information, descriptive information about the content (e.g., the name of a venue, event, city, street address, etc., which may be extracted from the content itself or provided by the recorder or recording device) and user identification information (e.g., information identifying the particular recorder and/or recording device). In some instances, such as when providing location information or time and date information, the information 113 may be generated and/or transmitted concurrently with the acquiring and/or streaming of the content 111 onto the network such that the information 113 reflects at any given time the location at which content 111 was acquired or the time of day and the date when the content 111 was acquired, as examples. The information 113 may be used by the system 100 to enable a variety of functions such as to allow viewer(s) 107 to search for content (e.g., based on geographic location, date and time, or event) and to enable the system 100 to tag received content 111, e.g., based upon location and/or permission levels defined in the user's profile, as described further below. In some examples, a GPS network may be used for determining the location of a recorder device. In some examples, a communication network (e.g., Wi-Fi, LTE, 4G) may be used for determining the location of a recorder device. It should be appreciated that other location identifying methods may be used as well. In accordance with various embodiments, the user location or user device location may be determined (e.g., by the processor 146) in accordance with any of the embodiments disclosed in provisional patent application No. 62/548,762, hereby incorporated by reference in its entirety.

In some examples, content 111 acquired by any of the recording device 110, 112, and 114 (or user-generated content) may be transmitted via the network 132 (e.g., a wireless network such as a Wi-Fi, 4G, LTE or other type of communication network) to a remote storage device 150 (e.g., a cloud storage server) and/or to an administrator device 140, which may be part of the same computing device as the remote storage device 150 or may be remote from the storage device 150 but communicatively connected thereto. To that end, one or more of the recording devices 110, 112, 114, may include a communication interface for connecting to the network 132 such as for streaming the recorded content (e.g. video) onto the network 132 and for transmitting information about the recorded content or recording device to the processor 146 and/or database 154.

Still referring to FIG. 1, the system 100 includes at least one viewer device 120, which may be associated with a viewer 107. The viewer device 120 may be any type of electronic device, which is capable of presenting content to a user and/or receiving user input for interacting with the content and/or the content-generation system, for example a laptop computer, a smart device (e.g., smart phone, tablet, smart watch, etc.), an AR, VR, or MR device such as an AR, VR, or MR headset or an AR, VR, or MR unit attachable to eyewear or other headgear. The viewer device 120 may include a user interface 122 for presentation of content generated by the system 100 (e.g., displaying a video recorded by user 103, or presenting a virtual, augmented or mixed reality environment to user 107) and/or for receiving user input 121 (e.g., search queries, or user commands for generating instructions to a recorder of system 100). In some embodiments, the user interface 122 may include display 124 configured to display content generated by system 100. The display 124 may include a two-dimensional display (e.g., a traditional flat screen display device such as an LCD, OLED, or the like), a three-dimensional display (e.g., using holographic display or other 3D display technology), or a pseudo 3D display such as a stereo display. In some embodiments, the user interface 122 may additionally and optionally include one or more other input devices (e.g., a keyboard, mouse, touch pad, touch screen, which may but need not be integrated with the display device, or a touchless interface) for receiving user input 121 (e.g., search queries and/or user commands) from the viewer 107. These user commands may be converted by the processor 146 to instructions 117, which are transmitted over the network 132 to one or more of the recording devices 110, 112, 114.

In accordance with principles of the present disclosure, the system may include a content-sharing computing platform 101, which may include at least one processor 146 and a storage device 150. The processor 146 and the storage device 150 may be communicatively coupled either wirelessly (e.g., via the network 132) and/or via a wired communication link (e.g., a data bus 159). In some example, the computing platform 101 may generate additional content 127 based on the user-recorded content 111 received from the one or more recording devices 110, 112, 114. For example, the computing platform 101 may implement a virtual reality engine, which generates a virtual environment based on the user-acquired content. The computing platform 101 may be communicatively coupled to the recording devices (e.g., 110, 112, 114, etc.) and to one or more viewer devices (e.g., 120) via network 132.

Figure 10:
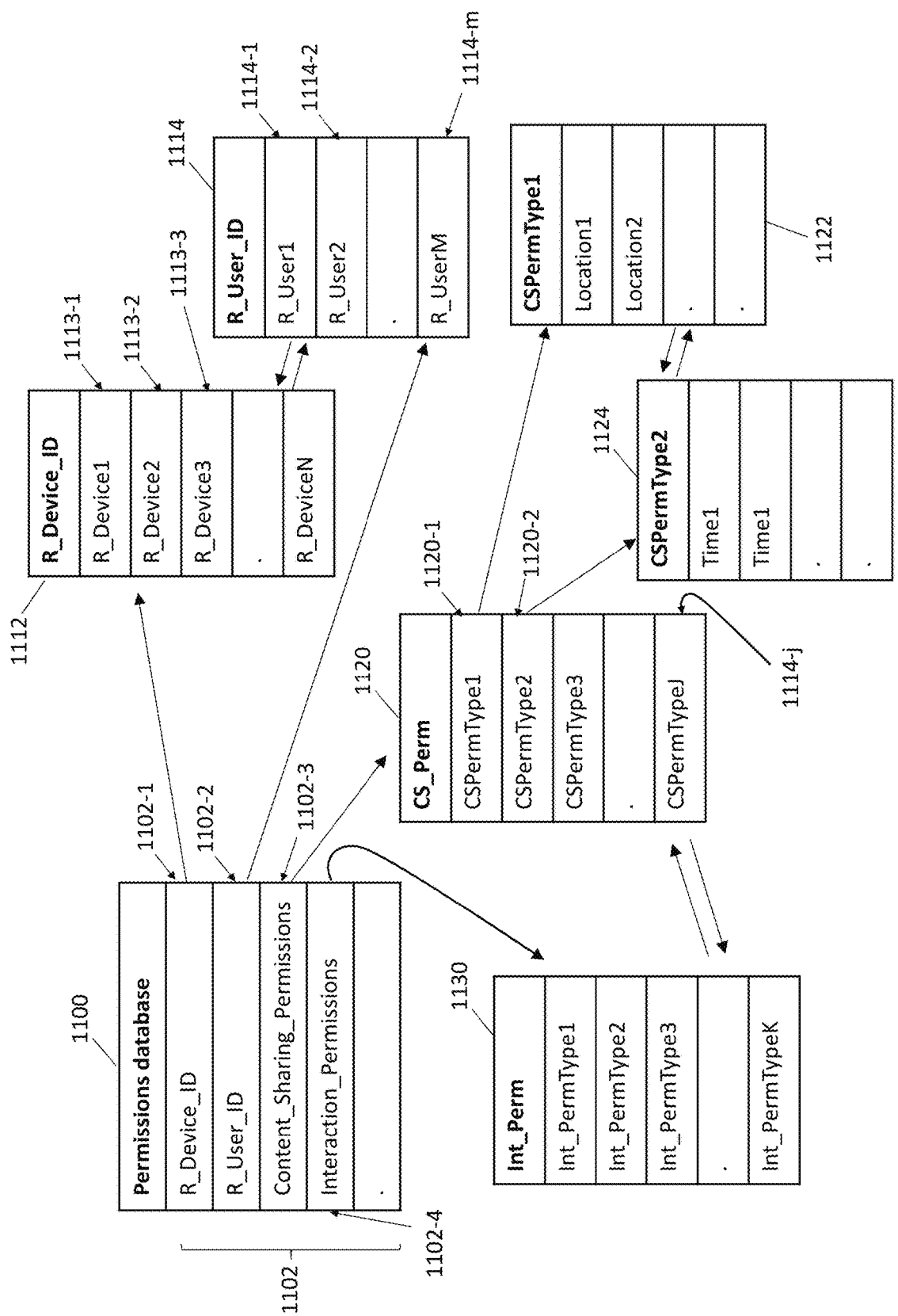
FIG. 10 is a diagram of data structures for implementing components of a content-sharing system in accordance with the present disclosure.

The processor 146 may be in communication with the storage device 150, which may be implemented in one or more servers comprising non-volatile memory 152 configured to store user-acquired content, user profiles, context data, and any other electronic data associated with operation of the system, collectively referred to herein as system data. The system data may be stored in one or more databases 154. For example, the database 154 may include a database component 153 that stores user profiles, and which may thus also be referred to as profiles or permissions database. The database 154 and components thereof (e.g., 153, 155, and 157) may be implemented using any suitable data structures including primitive and non-primitive data structures. For example, the database component 153 may be implemented using one or more tables or any suitable relational data structures (e.g., as shown in FIG. 10). The database 154 may include at least one additional database component 155 that stores user-acquired content, in some examples, the content database component may also store context data or metadata associated with the user-acquired content. The database 154 may include yet another database component 157, which stores system-generated content, such as VR/AR/MR content.

The processor 146 may be configured, via executable instructions 144, which may be stored in local memory 142 of the administrator device 140, to receive the information 113, the viewer-user input 121, and to select one or more items from the user-acquired content 111 for presentation to the viewer and/or for generating additional content 127 (e.g., VR/AR/MR content) for display to the viewer user 120. In some examples, the processor 146 may be further configured to perform the functionality associated with the creation of the AR/VR/MR content utilizing user-acquired content 111.

In one configuration, the computing platform 101 may include at least one computer (e.g., administrator device 140), which in a basic configuration may include one or more processors (e.g., processor 146) and system memory (e.g., local memory 142). A memory bus 143 may be used for communicating between the processor 146 and the system memory 142.

Depending on the desired configuration, processor 146 may be of any suitable type including but not limited to a microprocessor (µP), a microcontroller (µC), a digital signal processor (DSP), a graphics processing unit (GPU) or any combination thereof. Processor 146 may include one more levels of caching, such as a level one cache, a level two cache, a processor core, and registers (not shown). An example processor core may include an arithmetic logic unit (ALU), a floating point unit (FPU), a digital signal processing core (DSP Core), or any combination thereof. An example memory controller may also be used with the processor 146, or in some implementations the memory controller may be an internal or integral part of the processor 146.

Depending on the desired configuration, the system memory (e.g., local memory 142) may be of any suitable type including but not limited to volatile memory (such as RAM), non-volatile memory (such as ROM, flash memory, etc.) or any combination thereof. The system memory may include or store an operating system, one or more applications, and program data, which may be stored in the form of executable instructions 144. In some examples, the one or more applications may include pre-programmed and/or suitable trained machine-learning algorithms arranged to perform functions of the content-sharing system 100. Program data may include user profile parameters or settings that may be useful for administration of the content sharing by system 100. In some embodiments, the one or more applications may be arranged to operate with the program data on an operating system, such as an operating system that generates and displays graphical user interface(s) for querying the content of the content-sharing system 100 and for interactions between viewer and recorder.

The computing platform 101 may have additional features or functionality, and additional components or interfaces to facilitate communications between the administrator device 140 and other useful devices and interfaces (e.g., storage device 150). For example, a bus/interface controller may be used to facilitate communications between the administrator device 140 and the storage device 150, e.g., via the data bus 159. The data storage device 150 may include one or more removable or non-removable storage devices, which may be local (i.e., collocated with the administrator device 140) or remote (e.g., geographically separated from the administrator device 140), or any suitable combination thereof. Examples of removable or non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Other examples of computer storage media may include volatile and nonvolatile, removable and non-removable media implemented in any method or technology for storage of information, such as computer-readable instructions, data structures, program modules, or other data. For example, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing platform 101. The system memory (e.g., local storage 142), the storage device 150, as well as any various memory or storage devices of the recording and viewer devices may be implemented using any suitable computer storage media including the examples herein.

The computing platform 101, in some examples the administrator device 140 specifically, may include additional components such as an interface bus for connecting component of the platform 101 to various interface devices (e.g., output interfaces, peripheral interfaces, and communication interfaces). The communication interfaces may include any suitable devices for establishing a network communication link (e.g., a wireless communication link) to the network 132. The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer-readable media as used herein may include both storage media and communication media.

Figure 2A:
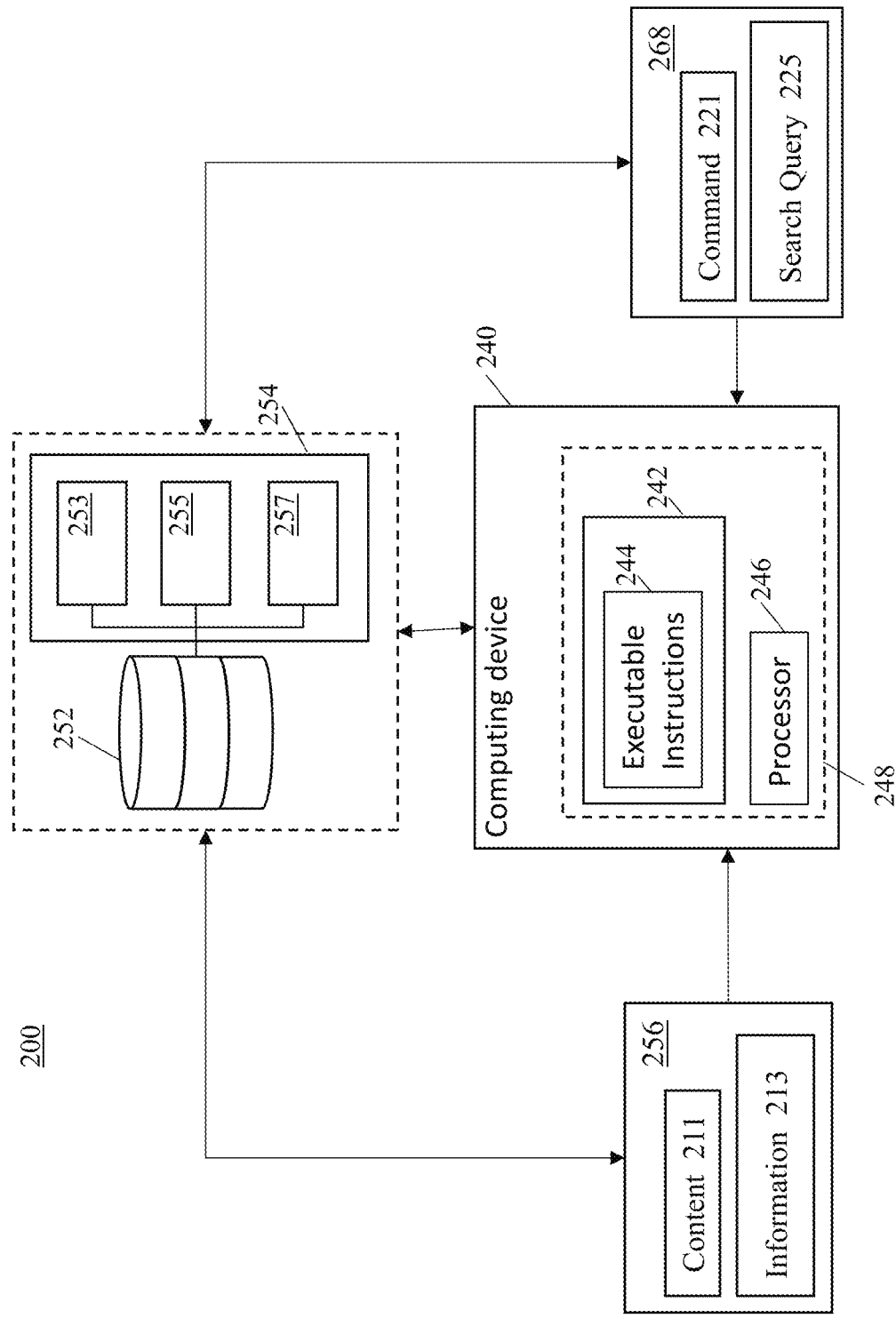
FIG. 2A is a block diagram of components of a content-sharing system in accordance with some examples of the present disclosure.

FIG. 2A shows an example of a content-sharing computing platform 200 for sharing and/or generating content based on user-acquired content. The computing platform 200 and components thereof may be used to implement at least some embodiments of the content-sharing network 100 of FIG. 1. The content-sharing computing platform 200 may include a database 254, which may be implemented in a storage medium 252, and a computing device 240 communicatively coupled to the database 254. The database 254 may be configured to store system data, for example, user profiles associated with users of the system, user-generated content (e.g., recorded video), context data, etc. The user profiles may be stored in a user profile database 253. Content (e.g., user-generated content or system-generated content) may be stored in a content database 255. The database 254 may include additional database components, such as a context database 257.

The individual user profiles stored in the user profile database 253 may be associated with respective recorder-users (or simply recorders) and may define an interaction profile for the respective recorder user. The interaction profile may include interaction level parameters or permissions (e.g., as part of the content sharing permissions for a particular user), which determine whether, when and under what circumstances, a recorder user is willing to share his content (e.g., his camera feed). In some examples, a user's profile may include different content sharing permission based on a location of the video recording device or a time of day when the video is being recorded. For example, the user's profile may define sharing permissions allowing the user's camera feed to be shared when the particular user is outside of his home, at a specific location such as a specific restaurant or event, but not when the user is at home, at work, in class, etc. In some examples, the sharing permissions in a user's profile may indicate that the user is willing to share his camera feed only during certain hours of the day, for example daytime, between the hours of 10 am-12 noon, or in the evening. In some examples, a recorder-user may be able to control the levels of access to their content (e.g., camera feed) by specifying different permissions for different circumstances (e.g., deny access to content when I am at home, or at specific times of day, give some access for example to view but not interact, when I am at school in a lecture, and give a greater level of access, for example to both view and instruct, when I am outdoors and/or outside of business hours). The sharing permissions may in some example be adjustable by the recorder on the fly, that is as the recorder is about to embark in a particular activity and if his previously set permissions were such that would allow his camera feed to be shared, the user may be provided with an interface (e.g., a GUI widget on his recording device) to allow him to change the permission (e.g., to non-sharing). The specific examples herein are non-limiting but are provided for illustration only and the scenarios may of course be revised, e.g., the user may change a previous non-sharing permission to a sharing permission at any time as may be desired by the recorder user.

As will be appreciated, the user's profile may define any number of content-sharing permissions including in some cases interaction level permissions. Content-sharing permission, generally, may refer to how the recording user would like the content-sharing system to treat the user's user-generated content (e.g., tagging specific videos, categories of videos such as videos associated with specific locations or times, as sharable or not sharable, whether to allow viewers to tap into the live feed of a camera during any specific times or at specific locations, what type of information or if the system is at all allowed to extract information from the user's videos, etc.). Interaction level permissions, generally, may refer to permissions defining to what extent a recorder is willing to interact with a user (e.g., whether the recorder is willing to take instructions, receive comments, etc.), such as during the recording and streaming of video.

In some examples, a recorder may receive notification when someone is accessing their content, for example the recorder's live camera feed. Whether or not a notification is provided may be set by a corresponding parameter in the user's profile. Also, if and when notifications are provided may also be differently controlled by different notification level parameters in a user's profile, for example a recorder may be interested to know if their camera feed is being accessed while in a specific location such as at a concert or other event but may not care if their camera feed is being accessed when walking around the city. In some examples, standard social media platform interaction functions may be enabled by the content-sharing platform, such as to enable viewers to post comments, rate, follow feeds, or otherwise tag content that has been shared via the content-sharing network. These types of interaction functions may also be controllable by parameters in the users' profiles.

Referring back to FIG. 2A, the computing device or computer 240 may include a processor 246 and a memory 242 comprising executable instructions 244, which when executed by the processor 246 cause the processor 246 to perform the functionality of a content-sharing engine 248.

The content-sharing engine may facilitate the sharing of content by receiving user-generated content 211 (e.g., live video streams), and information 216 accompanying the user-generated content and determining whether and with whom the content may be shared. For example, in a video feed sharing scenario, the processor 246 may receive video from a video recording device associated with at least one recorder user of the system. The processor 246 may retrieve or access the interaction profile of the given recorder user to determine whether and to what lever the content may be shared, and further to what level the recorder may be willing to interact with viewers. The processor 246 may tag the received content as either sharable or non-sharable based on the permissions in the interaction profile of the particular recorder user. In addition to the recorder-user input data 256, the processor 246 may also receive (via a network such as network 132), viewer-user input data 268. The viewer-user input data 268 may initially include a search query 225. The viewer user may search the content-sharing computing platform 200 for desired content (e.g., a live camera feed from a specific location, or a camera feed from a specific date and time, or system-generated content such as virtual reality content produced from the user-generated content. Referring back to the video feed sharing scenario, the processor 246 may receive the viewer-user input which may specify information about desired content, e.g., in the form of a search query, and the processor 246 may determine, using the viewer-user specified information, whether the content-sharing system has matching content to the desired content (e.g., whether any video in the system corresponds to the search query). The processor 246 may then provide the matching content to the viewer user if the content has been tagged as sharable, otherwise, the system may continue to search for other content that matches the search parameters and that have the appropriate sharing permissions. A great variety of search queries can be performed and supported by embodiments of the present disclosure.

For example, content consumers may search based on location or a particular stream or user (e.g., based on identifying information of the particular user or recording device). In other examples, search results may be filtered by when the content (e.g., video or audio recording) was generated (e.g., live, last 5 minutes, every Monday, etc.). Searches may be performed based on a type of recorder-user or category or recorder-users, e.g., French-speaking users, users over a given age, user living in a particular neighborhood, etc. Search results may reveal the content coverage for a particular area, which may be indicative of the quality of information that can be derived from the user content. For example, the larger number of feeds that may be available from a given location, the more accurate the data extracted from that location may be as there are more data points upon which the system would base the derived content. Similarly, the video feeds available from a given location, the higher quality VR environment may be able to be built by the system.

In some embodiments, the processor 246 may additionally or alternatively execute instructions for a virtual reality engine. In some embodiment, the processor 246 may be configured to receive at least two videos from two cameras (e.g., two cameras at the same general location but providing two different viewpoints). The processor may generate a virtual environment using the two videos, for example by combining the content (e.g., two different viewpoints) to provide content in these two viewpoints in the virtual environment. In practice, a virtual reality of this type may be generated (or stitched together) from a multitude of video streams. In some examples, the video content may be used to enhance an other-wise computer generated virtual environment, for example to add real-world information such as traffic information, information about the waiting line in a particular venue or restaurant, or information about daily pricing or specials in a particular restaurant or other type of merchant, etc. As described, the videos may be accompanied with information about the video and/or recording device, such as the physical location of the device, which information may be used in reconstructing a virtual environment from the received video streams. In some embodiments, the content produced by the system may be based on one or fewer of the videos available on the network, while other videos not used for reconstructing the environment may be used to enrich the virtual environment, such as by concurrently providing text or audio (e.g., overlying information onto the virtual environment or by vocalizing the information during display). The info may include factual data (e.g., the cost for product A today is X dollars), advertisements, comments, and use ratings, and other type of data. The features and functionality of computing platform 200 may be implemented using any suitable combination of software, hardware, or firmware components specifically arranged to perform or facilitate the processes, features, and/or functions described herein, including some or all of the components or similar to the components to computing platform 101 of FIG. 1.

Figure 2B:
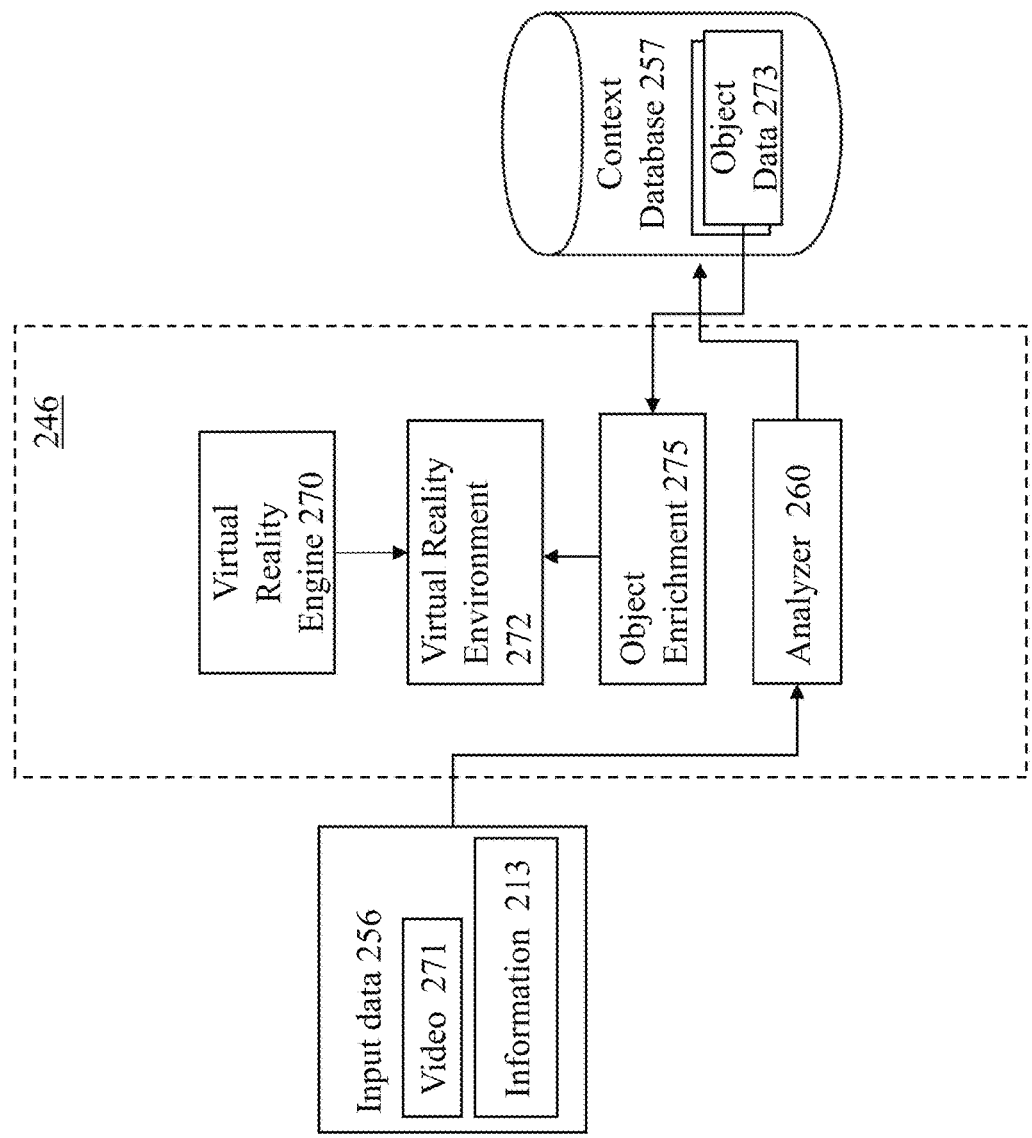
FIG. 2B is a block diagram of further components of a content-sharing system in accordance with some examples of the present disclosure.

Referring now also to FIG. 2B, the processor 246 may, in some embodiment, implement a virtual reality engine 270, which may produce a virtual reality environment 272 based on user-recorded content (e.g., video 271). In the example in FIG. 2B, the processor 246 receives the input data 256 including the video 271 and information 213 associated with the video. The analyzer 260 analyzes the input data 256 to detect objects (e.g., a particular person, a particular place, a type of animal, plant, venue, building, etc.) that may appear in the video 271 or be associated with the time-location indicated in the information 213. Once the objects are detected, a request for information associated with the objects is sent to the context database 257. The database 257 provides the object data 273 to the object enrichment module 275, which enriches the virtual reality environment 272 that is being transmitted or streamed to the user. This process may occur in real-time or post hoc. The system shown in FIG. 1 can be used not only for object enrichment, but also for extracting information from the input data 256 in order to update the context database 257, which can be done simultaneously or instead of enriching the virtual reality environment 272. In an embodiment where the context database 257 is being updated with information from the input data 256, the context database 257 may be accessible to users to look up information about an object (e.g. a place or a restaurant) via an internet website, and the database may thus be useful to a variety of other systems other than a content-generation system according to the examples herein. For example, the input data 256 may be analyzed to identify the current specials listed on a restaurant menu, and the context database 257 can store that information and make it available to users to look up via a website, or provide that information to third parties for various purposes. Other examples of information that can be obtained from the input data 256 and stored in the context database 257 include whether an item is available in a store and for what price, whether an employee is at a help desk, and related information.

The analyzer 260 can analyze the video 271 in a variety of different ways including image recognition technology, object recognition technology, artificial intelligence programs in communication with the internet, google searches and other internet queries, human analysis, recording-user location data, crowd-sourced data, data received from the video recording device and input by the recording-user, and data received from the viewer device and input by the viewer, and any other analysis process or data source known by those of skill in the art familiar with the present disclosure. The object enrichment 275 may include enriching the virtual reality environment 272 by performing at least one of overlaying text, displaying advertisements, displaying comments, displaying user ratings, and any other form of enrichment known by those of skill in the art having the benefit of the present disclosure. The information 213 included with the video 271 can be used to enhance the analysis of the input data 256. For example, if the context database has information indicating that a famous person is in a certain location at a certain time, the analyzer 260 might use the time and location data included in the information 213 of the input data 256 to recognize that the video 271 is in the same location at the same time as the famous person, and therefore the analyzer 260 may search faces appearing in the video 271 for the famous person, or send a notification to either the recording user or the viewer.

Figure 3:
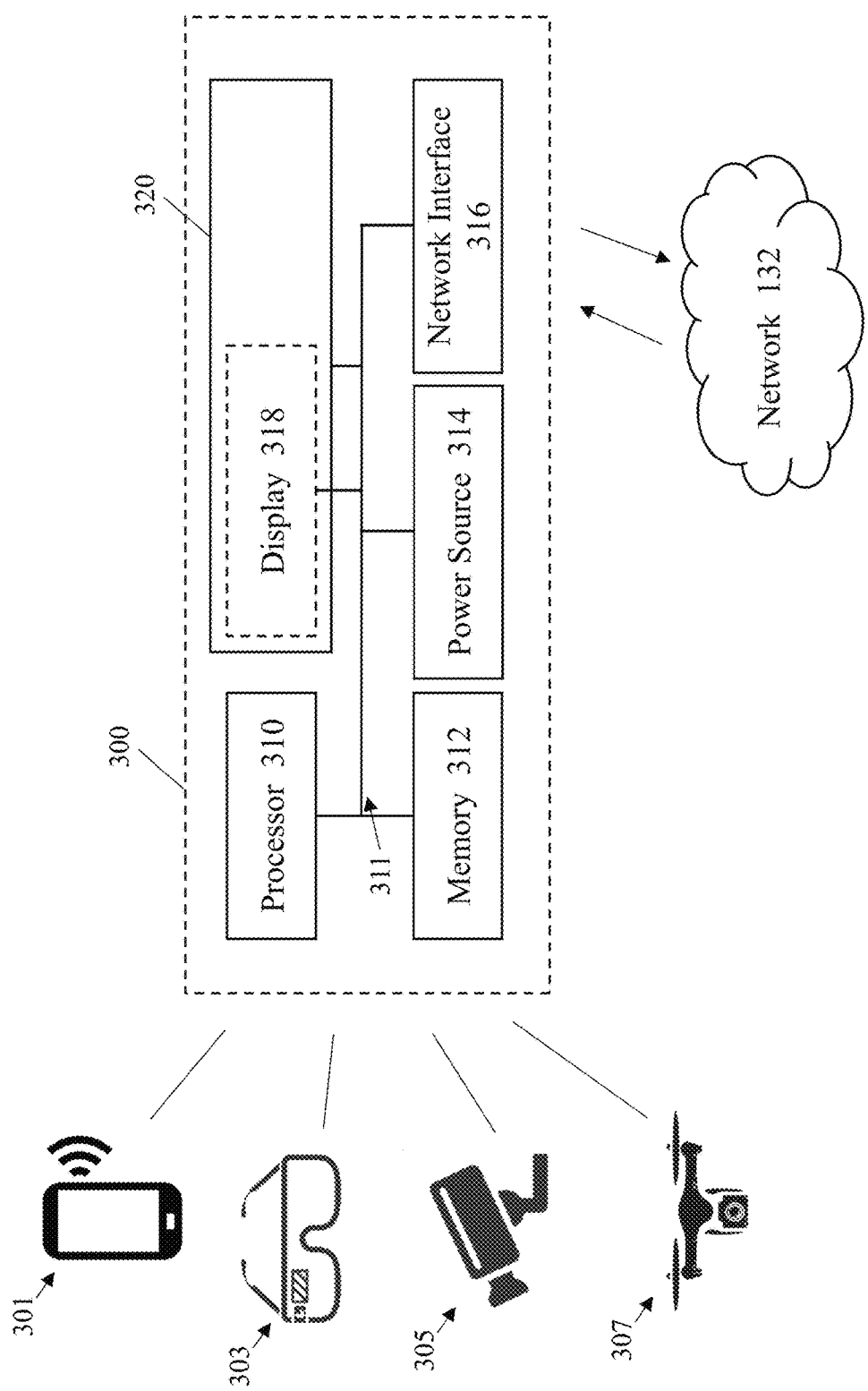
FIG. 3 is a block diagram of a recording device in accordance with some examples of the present disclosure.

FIG. 3 show, in diagrammatic form, an example of a recording device 300, which may be used to implement one or more of the recorder devices 110, 112, or 114 in FIG. 1. As previously described, the recording device 300 may be any type of electronic device, which is capable of acquiring user content, e.g., capturing audio and/or video. For example, the recording device 300 may be any type of portable electronic device that includes a camera for capturing video, such as any type of mobile computing device 301 (e.g., a smart phone, a tablet, or a laptop), a camera (e.g., handheld camera, wearable camera 303, or a stationary camera 305 attached to a building or other stationary structure, or a camera 307 attached to a drone or other movable base). In some examples, the recording device may be part of a VR, AR, or MR wearable unit includes at least one camera and at least one display. As shown in FIG. 3, the recorder device 300 may include a processor 310, a memory 312, a power source 314, a network interface 316, and a user interface 320, which may include one or more input/output component(s), which may optionally include a display 318. In some examples, the one or more input components enabling the user to interact with the device 300 and or content recorded by the device 300, such as one or more touch sensor(s) (e.g., for turning on and off functionality of the recording device, or initiating content capture), a speaker for receiving audio instructions, a microphone, and other touchless interface components for providing user input (e.g., for providing or supplementing the information associated with the recorded content). One or more of the components of device 300 (e.g., processor 310, memory 312, and network interface 320) may be communicatively connected, e.g., via a data bus 311.

The processor 310 may be implemented using one or more processing units, for example single or multi-core CPU(s), GPU(s), or other processing component(s) capable of being programmed to perform the functions associated with viewer device 300 such as to control the operation of the device 300 for recording content and transmitting the content and related information to the system 100 via the network 132. The processor 310 may be implemented using any other suitable processor, including any of the examples herein.

The memory 312 may include volatile and non-volatile memory configured to store electronic data utilized by the device 300, for example processor-executable instructions for programming the processor to perform the functions associated with the recording device 300. Additionally, the memory 312 may be configured to store user-acquired content, e.g., audio files, video files, document files, profile parameters, and so on, as may be appropriate in a particular scenario. The memory 312 may include, for example, non-volatile storage, a magnetic storage medium, optical storage medium, magneto-optical storage medium, read only memory, random access memory, erasable programmable memory, flash memory, or a combination of one or more types of memory components. The memory 312 may be implemented using any other suitable non-transitory computer readable medium, including any of the examples herein. The device 300 may also include a power source 314 to provide power to the various components of the computing device. The power source 314 may include one or more batteries, which may be rechargeable such as via a wired or wireless (e.g., inductive) power transfer.

The user interface 320 may include one or more input and output devices. For example, the user interface 320 may include one or more output devices such as a display for graphically displaying instructions from viewer(s), audio feedback component such as a speaker for audibly presenting the instructions to the recorder, and/or a tactile feedback component, such as one or more vibrators arranged at various peripheral locations of the recording device to provide tactile instructions on how to adjust the position, orientation, or aiming direction of the recording device to obtain the desired content. In examples in which the recording device includes a display 318, the display 318 may be implemented using two-dimensional display technology (e.g., a traditional LCD, OLED, QLED, or the like), 3D or pseudo 3D display technology (e.g., holographic display, stereo display, or others), or any combination thereof. In some embodiments, the display 318 may be provided as a see-through display, which may include a combiner for combining computer-generated content (e.g., instructions) with the real-world view visible through the see-through display.

In some embodiments, the display 318 may be a touch sensitive display and may therefor also function as an input device. The device 300 may alternatively or additionally include one or more other input devices such as a keyboard, mouse, touchpad, stylus, or the like, for providing information about recorded content, and/or defining or modifying user profile parameters. In yet further examples, the device 300 may include a touchless interface whereby the device 300 may be capable of receiving user inputs via gesture commands, voice commands, eye tracking, VR gloves or other VR peripherals, and any combination thereof.

The network interface 316 may include any combination of wired or wireless communication components configured to enable transmission and reception of data to and from the network 132. The network interface 316 may include one or more wireless communication component(s) configured to operate within the LTE, 4G, GSM, or other cellular network, and/or configured for standard Wi-Fi, Bluetooth, ZigBee or other wireless network communication protocols. In some examples, the network interface 516 may additionally or alternatively include one or more components for connecting to a wireless network gateway via a wired local area network (e.g., Ethernet).

In various embodiments, the recording device 300 may include a camera, multiple cameras, 3D camera, rotating camera, user controlled camera, AI controlled camera, 360° camera, or any combination thereof. In various embodiments, the information transmitted from the recording device (e.g., information 113 in FIG. 1) may include the time, location, camera angle, elevation, weather-related information (e.g. precipitation level, brightness, temperature), information associated with the hardware of the recording device, information associated with the recording-user (or recorder), or information input by the recording-user, and may be either previous, current, or future information of any type, and be linked or embedded with the video stream, or encrypted therewith.

Figure 4:
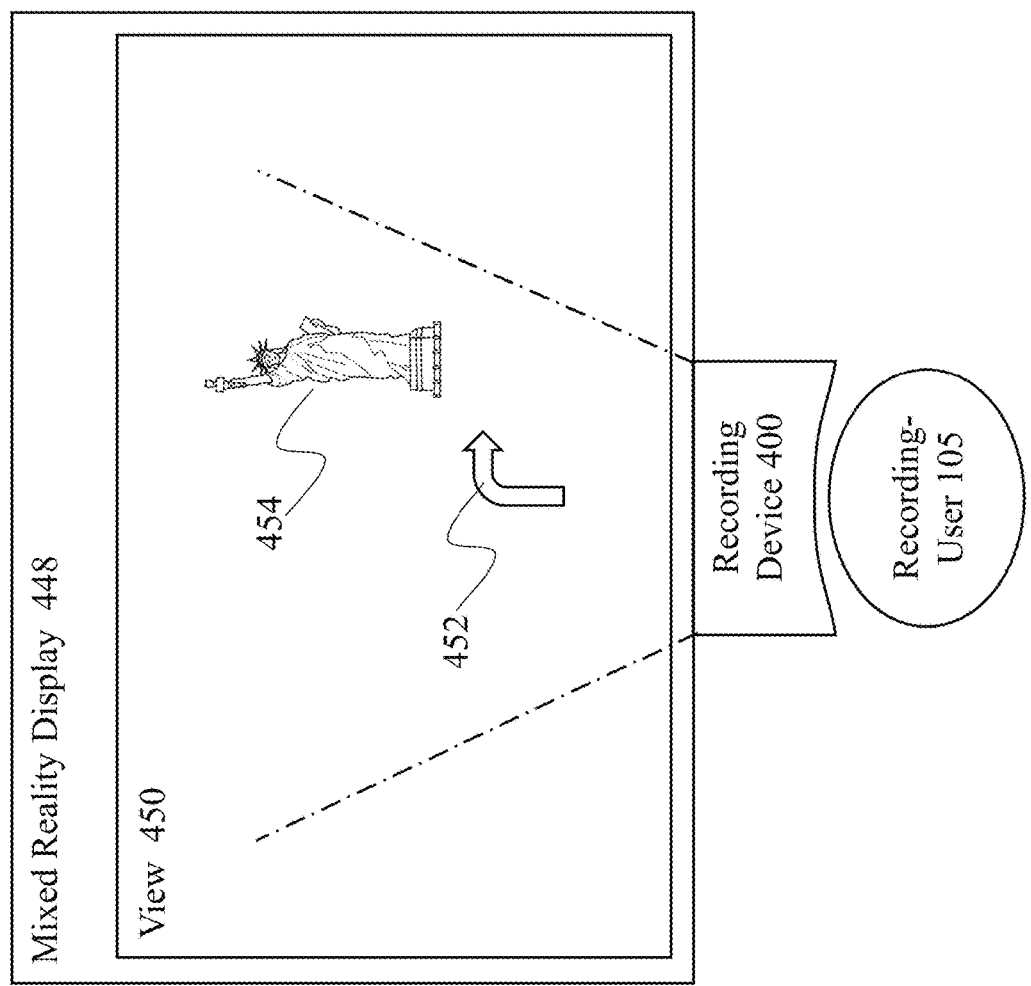
FIG. 4 is a diagrammatic representation of a graphical user interface of a recording device in accordance with some examples of the present disclosure.

FIG. 4 shows elements of an example user interface of a recording device 400 in accordance with some embodiments herein. The recording device 400 may be used to implement, at least in part, any of the recording devices described herein. As shown in FIG. 4, the recording device 400 may include a mixed reality display 448, which combines digital and real-life elements within the displayed view 450. The mixed reality display 448 may be implemented using a see-through display that combines elements from the real-world (e.g., an object 454 in the user's surroundings as perceived through a see-through optical element worn by the user) and digital content (e.g., the GUI element 452, in this example providing an instruction to the recording user 105 to adjust the viewing angle of the recording device 400 to the right).

As such, by overlaying an indicator or other form of GUI element providing instruction on the display, the user 105 can still perceive the real-life view event while simultaneously receiving instructions from a viewer (not shown). In some examples, the view 450 in the see-through display may be substantially the same as the view available to the viewer on the viewer device (e.g., device 120 in FIG. 1). In some examples, the view 450 in the see-through display may be larger than that displayed on the viewer device, and thus the viewer may direct through instructions, which in the case of live streaming may be generated and transmitted to the recorder in real time as the recorder experiences the real-life environment.

As described, electronic data may be transmitted to the recording device 400 from the content-sharing system 100 via the network 132, which data causes the processor of the recording device 400 to generate an indicator based on the user commands received from a viewer device. Instructions from viewers may be presented to a recorder in a variety of ways, such as via audible instructions, tactile instructions (e.g., the right or left side of the AR/MR headset or glasses may vibrate to indicate to the user to turn their head in that direction), or via graphical user elements such as the indicator (e.g. the GUI element 452) in the example in FIG. 4. In other examples, the indicator may be in the form of text instructing the recorder to perform a specific action (e.g., slow down, stop, turn your head or the camera to the left, right, up, down, capture a 360 view, etc.). In yet other examples, differently shaped graphical indicators may be used, such as a start, diamond or circle may be used to highlight or identify a specific object in the scene that may be of interest and the viewer-user may want to further explore, or an illumination such as a blinking light or pattern of lights directing the recorder to focus on a specific object or direct the viewing angle in a specific direction as indicated by the illumination.

In another exemplary scenario, a viewer (e.g., viewer 107) may perform a "live" search for information. For example, the viewer may be interested in purchasing a product, for example getting something to eat from a deli or a restaurant that is known for long lines or wait times. The viewer may search on the content-sharing platform 101 for live video streams from recorders at the location of interest, and if recording devices, with appropriate sharing permissions are identified by the system in proximity to the viewer's desired location, the viewer can access the feed(s) and obtain a live visual confirmation of the current situation (e.g., the wait time or length of the line, the current pricing for an item, the specials on the menu of the viewer's favorite restaurant, etc.). As will be appreciated, numerous scenarios can be envisioned which may be benefit from conducting a live search and obtaining a live visual confirmation of the situation in a particular environment (e.g., the wait time at a restaurant, the traffic downtown, the crowd at an event, etc.) in accordance with the principles of the present disclosure.

Figure 5:
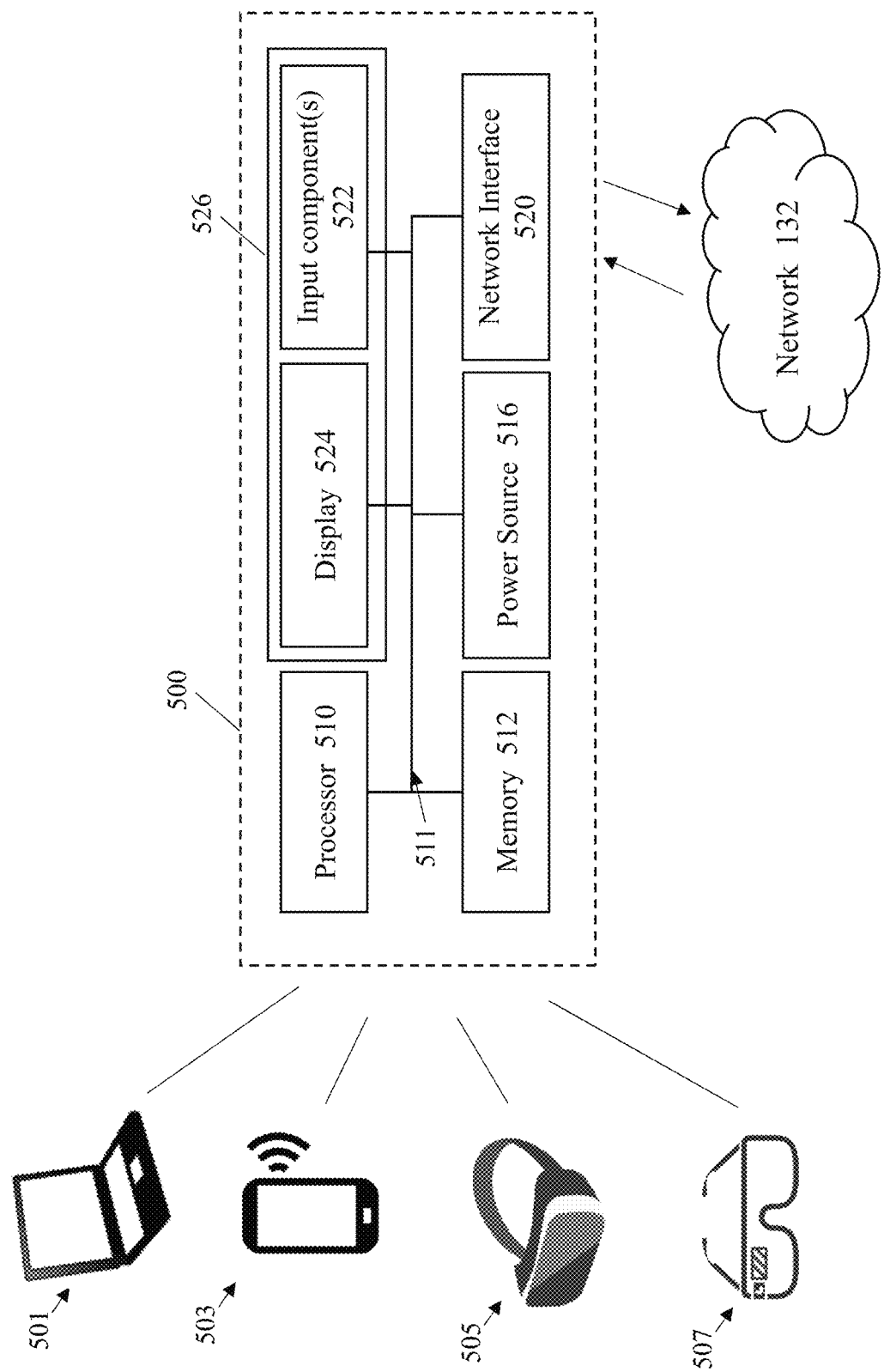
FIG. 5 is a block diagram of a viewer device in accordance with some examples of the present disclosure.

FIG. 5 shows, in diagrammatic form, an example of a viewer device 500, which may be used to implement one or more of the viewer devices 120 in FIG. 1. As previously described, the viewer device 500 may be any type of electronic device, which is capable of presenting content to a user and/or receiving user input for interacting with the content and/or the content-generation system. For example, the viewer device may be a laptop computer 501, a smart device 503 (e.g., a smart phone, tablet, or other), an AR, VR, or MR device such as an AR, VR, or MR headset 505 or an AR, VR, or MR unit 507 attachable to eyewear or other headgear. The viewer device 500 may include a processor 510, a memory 512, a power source 514, a network interface 516, and a user interface 526, which may include one or more input components 522 (e.g., touch sensor(s), a keyboard, a microphone for receiving voice commands, a touchless interface that utilizes gesture recognition technology, or others) and one or more output components (e.g., a display 524, which may be integrated with the touch sensor(s) in a touch-sensitive display, a speaker, and others). One or more of the components of device 500 (e.g., processor 510, memory 512, network interface 520, and I/O components) may be communicatively connected, e.g., via a data bus 511.

The processor 510 may be implemented using one or more processing units, for example single or multi-core CPU(s), GPU(s), or other processing component(s) capable of being programmed to perform the functions associated with viewer device 500 such as to control the operation of the device 500 to receive content from the network 132, display the received content, receive user inputs (e.g., search queries and user commands) and transmit the search queries and/or user commands to the network 132 for retrieving the relevant content and/or generating instructions to recorders. The processor 510 may be implemented using any other suitable processor, including any of the examples herein.

The memory 512 may include volatile and non-volatile memory configured to store electronic data utilized by the device 500, for example processor-executable instructions for programming the processor to perform the functions associated with viewer device 500. Additionally, the memory 512 may be configured to store user-acquired content, e.g., audio files, video files, document files, and so on, as may be appropriate in a particular application. The memory 512 may include, for example, non-volatile storage, a magnetic storage medium, optical storage medium, magneto-optical storage medium, read only memory, random access memory, erasable programmable memory, flash memory, or a combination of one or more types of memory components. The memory 512 may be implemented using any other suitable non-transitory computer readable medium, including any of the examples herein. The device 500 may also include a power source 206 to provide power to the various components of the computing device. The power source 206 may include one or more batteries, which may be rechargeable such as via a wired or wireless (e.g., inductive) power transfer.

The user interface 526 may include one or more input and output devices. For example, the user interface 526 may include a display 524 for displaying content generated by system 100 (e.g., user-acquired content, such as video, or content produced by the computing platform 101 based at least in part on user-acquired content). The display 524 may be implemented using two-dimensional display technology (e.g., a traditional LCD, OLED, QLED, or the like), 3D or pseudo 3D display technology (e.g., holographic display, stereo display, or others), or any combination thereof. In some embodiments, the display 524 may be a touch sensitive display and may therefor also function as an input device. The device 500 may alternatively or additionally include a keyboard, mouse, touchpad, stylus, or the like. In yet further examples, the device 500 may include a touchless interface whereby the device 500 may be capable of receiving user inputs via gesture commands, voice commands, eye tracking, VR gloves or other VR peripherals, and any combination thereof. Depending on the type of content being presented to the user, different output components can be used to allow a consumer to consume (e.g., view, listen, or feel) the content.

The networking/communication interface 516 is configured to enable reception and transmission of data to and from the network 132. The networking/communication interface 516 may include any combination of wireless communication component(s) configured to operate within the LTE, 4G, GSM, or other cellular network, and/or configured for standard Wi-Fi, Bluetooth, ZigBee or other wireless network communication protocols. In some examples, the networking/communication interface 516 may, additionally or alternatively, include components for connecting to a wireless network gateway via a wired local area network (e.g., Ethernet).

Figure 6:
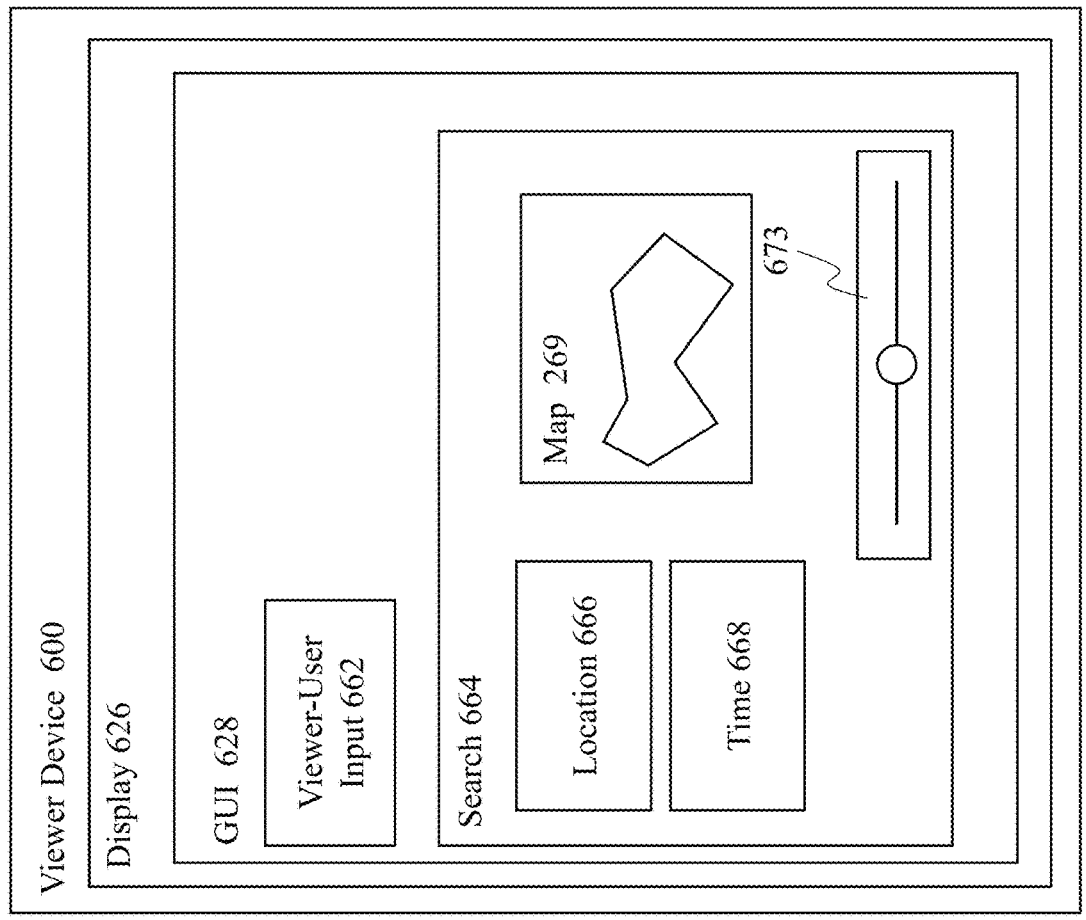
FIG. 6 is a diagrammatic representation of a graphical user interface of a viewer device in accordance with some examples of the present disclosure.

FIG. 6 shows a user interface of a viewer device 600 in accordance with examples of the present disclosure. The user interface may enable the viewer user associated with device 600 to interact with a content-sharing system (e.g., system 100) according to examples herein. Components of viewer device 600 in the example in FIG. 6 may be used to implement components of the viewer device 120 in FIG. 1. The user interface may include a graphical user interface 628 provided on a display 626 of the device 600.

The GUI 628 may receive viewer-user input 626 from the user indicating a selection of a video or preferences of the user. The GUI also includes a search widget 664 allowing the user to look for a particular video or point in a video. The search widget 664 may be configured to receive user input indicative of a target location 666 (e.g. Central Park in New York City) and/or user input indicative of a target time 268 (e.g. current time, or another such as 2:15 PM on Saturday Mar. 10, 2019) for which the user would like to view video content. This allows the user to not only search the content database (e.g., 155 in FIG. 1) by a video name or user name or topic, but also by location and time, or other type of metadata which is associated with the content and which may be concurrently transmitted with the content by the recording device. Different types of search widgets may be provided to accommodate any variety of combinations of search parameters discussed elsewhere herein. A search widget may be further configured for live tracking of the recording device, such as in situations where the recording device is moving as the content is being captured. In such examples, the search widget 664 may be further equipped with a map GUI element 269. The map GUI element 269 may be displayed concurrently as the video is streaming such that the location of the recording device recording the video is indicated on the map GUI element 269. In further examples, the search widget 664 may include a slider widget 673 to enable the viewer-user 120 to adjust the time-based location displayed on the map 269 by moving the slider of the slider widget 673. The map 269 may be dynamically updated in real time as the slider moves so that the viewer-user 120 can navigate to a desired point in the video that is being viewed. In other embodiments, the search widget 664 can provide any number of display icons and input boxes for fine tuning the search parameters, for example to add additional search parameters such as recorder-user or recording device identifying information, category, title, genre, style, or any other type of search parameter for the given type of content being requested from the system.

Figure 7:
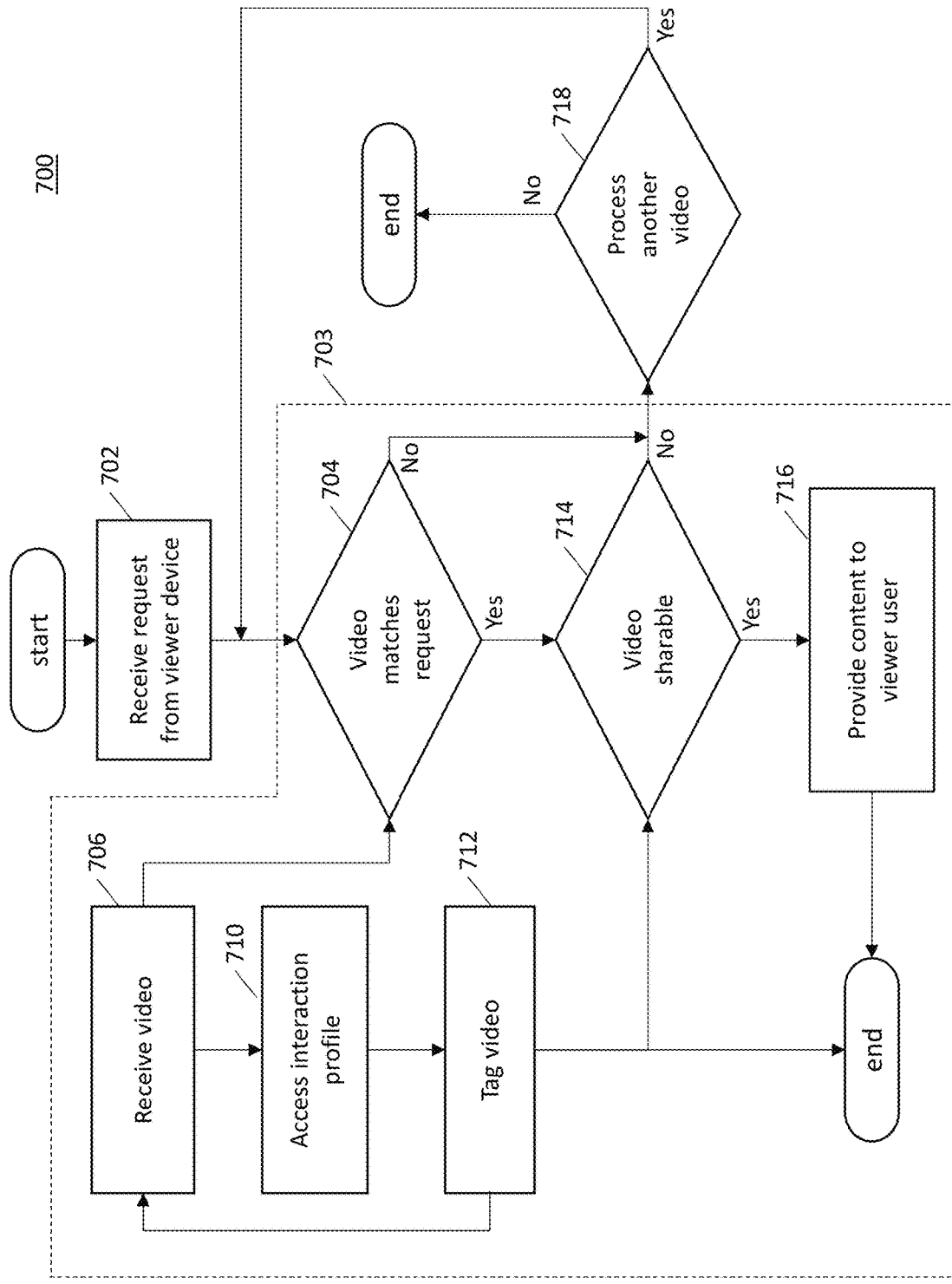
FIG. 7 is a flow diagram of a process for content sharing in accordance with examples of the present disclosure.

FIG. 7 shows a flow diagram of a process 700 for content sharing in accordance with some of the examples herein. The process 700 may include a step of receiving a viewer user request or query, as shown in block 702. For example, a viewer user 107 may search or query the content-sharing network for desired content (e.g., a live event, information about a particular business or destination of interest, etc.). The viewer user 107 may search or query the network via a graphical user interface having one or more of the elements described with reference to FIG. 6. In other examples, the viewer user request may be received by any suitable combination of voice and/or text commands and/or manipulation of graphical UI elements, such as on a touch screen interface of a mobile device (e.g., smart phone). The request or query may be transmitted from the viewer device 120 to a processor (e.g., processor 146) of the content-sharing platform 101 via network 132.

At any given time before or in parallel with processing queries from viewer devices, the content-sharing network may be receiving content from recording devices. For example, at least one recording device 110 may be streaming content (e.g., a video) as the device 110 is recording the content onto the network. The content (e.g., video) is received, as shown in block 706, by the content-sharing platform 101 via network 132. The content-sharing network may additionally include previously received user-generated content and system-generated content. Whenever the content-sharing network receives user-generated content, the network may query a permissions database to determine whether the content is sharable. As described herein, a permissions database may store user profiles that define the content-sharing and interaction level permissions for the various recording users and devices in the network. As shown in block 710, the content-sharing network may accesses the interaction profile associated with the user or device from which the content at block 706 is received and tag the received content as either sharable or non-sharable, as shown in block 712. In some embodiments, a content-producer may assign permissions to his or her user-generated content that may prevent sharing the content in its raw form (i.e., as recorded) but nonetheless permit usage of the user-acquired content for other purposes, such as for analysis or mining the content information that can be used to produce system-generated content. In some such scenarios, the non-sharable content (e.g., videos) may be provided to a processor for analysis (e.g., processor 246) and the process may return to block 706 to await additional content from the same user/device or may process content received from other users/devices to determine if sharable or non-sharable. In other embodiments, user-generated content that can neither be shared nor mined may not be retained (e.g., in storage) on the system to conserve resources. For example, a user's permissions may designate a window of time between 10 am and 12 noon during which any content streamed from the user's device onto the network 132 is non-sharable or minable and any such content may either be deleted by the system upon receipt or prevented from uploading onto cloud storage. Continuing with the same example, at the designated time (e.g., 12 noon) when content from the same recorder/device becomes sharable, the system may automatically switch operation to receiving and storing user-acquired content from this recorder/device.

Referring back to the example in FIG. 7, the process 700 may determine, at block 704, whether the user-generated content (e.g., the video received at block 706) matches the viewer's request. If yes, the process 700 may next determine, at block 714, whether the user-generated content (e.g., the video received at block 706) is sharable based on the tagging performed at block 712. If the content is sharable, the user-generated content or system-generated content based on the user-generated is provided to the viewer device, as shown in block 716. If the specific content (e.g., video received at block 706) is not sharable, the process 700 determines, at block 718, whether additional content (e.g., one or more additional videos from the same or other recorders/devices) is to be evaluated for sharing. If another content item is to be evaluated, the process returns to the location in the process flow just before block 704, and one or more of the steps in the process block 703 may be repeated for any additional content items available on the content-sharing network.

Figure 8:
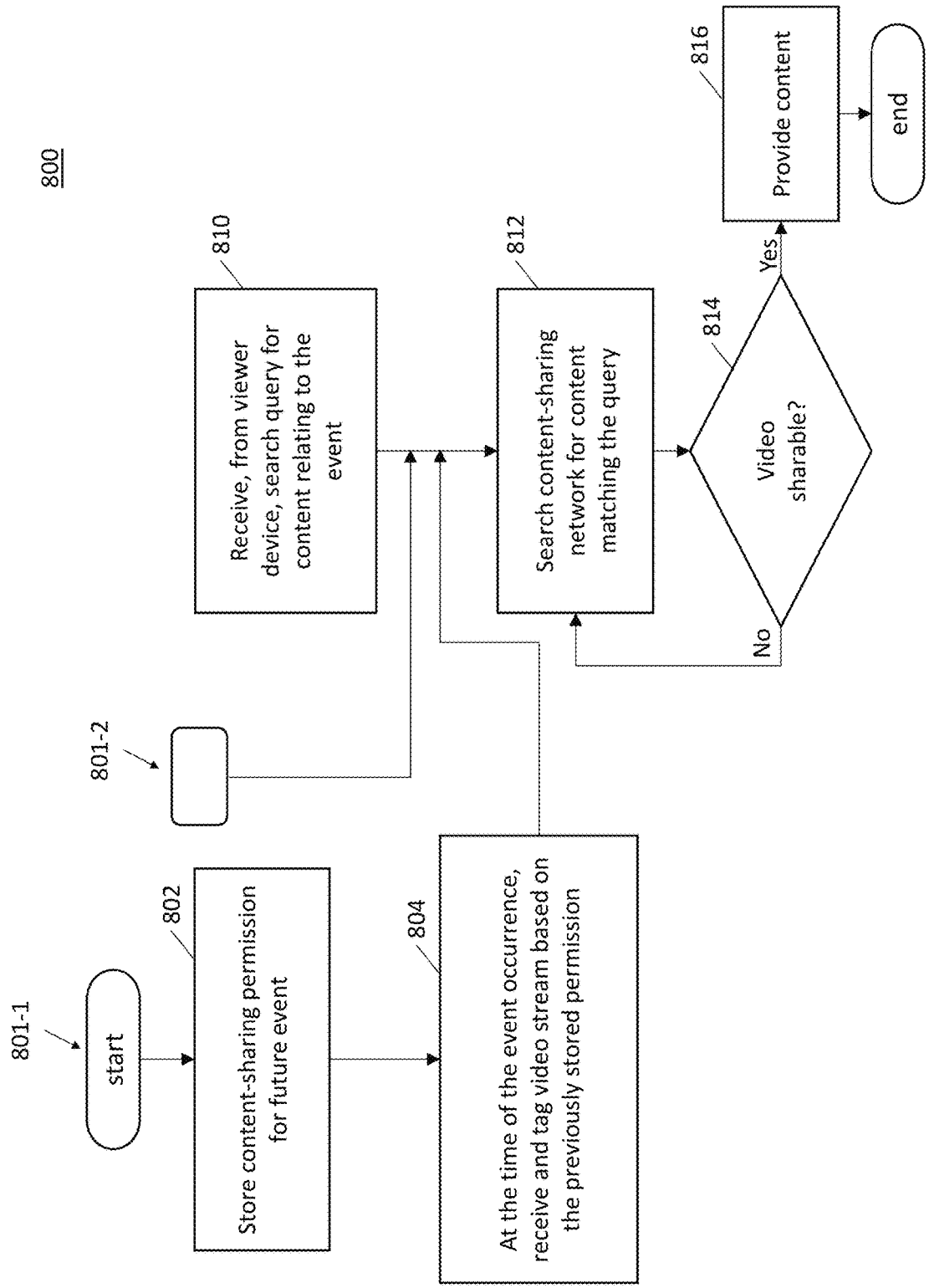
FIG. 8 is a flow diagram of a process for content sharing in accordance with further examples herein.

FIG. 8 shows a flow diagram of a process 800 for sharing content in accordance with further examples of the present disclosure. According to process 800, the system 100 may facilitate the setting of content-sharing permissions for future events, which may obviate the need for the recorder to go through a content sharing set up process each time the recorder is about to record/upload content thus making the content-sharing process more seamless. As shown in FIG. 8, a recording user may set content-sharing permissions for any future event (e.g., a specific named event, or an event identified by date, time, and/or location), which, as shown in block 802, may be stored by the content-sharing network 100. At the time of the event, as the recorder acquires and streams the content onto the network, the content-sharing network 100 may tag and video stream based on the previously stored permissions, as shown in block 804. As shown by process flow paths 801-1 and 801-2, the content-sharing network 100 may be receiving content from multiple devices in parallel, and the process flow path 801-2 may include the same or similar steps as process flow paths 801-1. In some examples, the content received in parallel may be from different recording devices but may relate to the same event and may be used together to produce enhanced content for sharing, e.g., as in the example described further below with reference to FIG. 11.

Referring back to the example in FIG. 8, a processor of the content-sharing network may receive from viewer device 120 a search or query about the event, for example the specific named event, or a type of event occurring at a given date, time or location, as shown in block 810. The content-sharing network may be search for content that matches the viewer's request or query, as shown in block 812. For example, content received at block 804 is processed to determine whether it matches the viewer's request. For any matching content, the processor 146 may determine whether the content (e.g., video) is sharable, as shown in block 814, and if sharable, provide the content to the requesting viewer, as shown in block 816. If the content is determined not to be sharable, the process loops back to search for additional content that matches the viewer's query, which may be content supplied for example from different recording devices.

Figure 9:
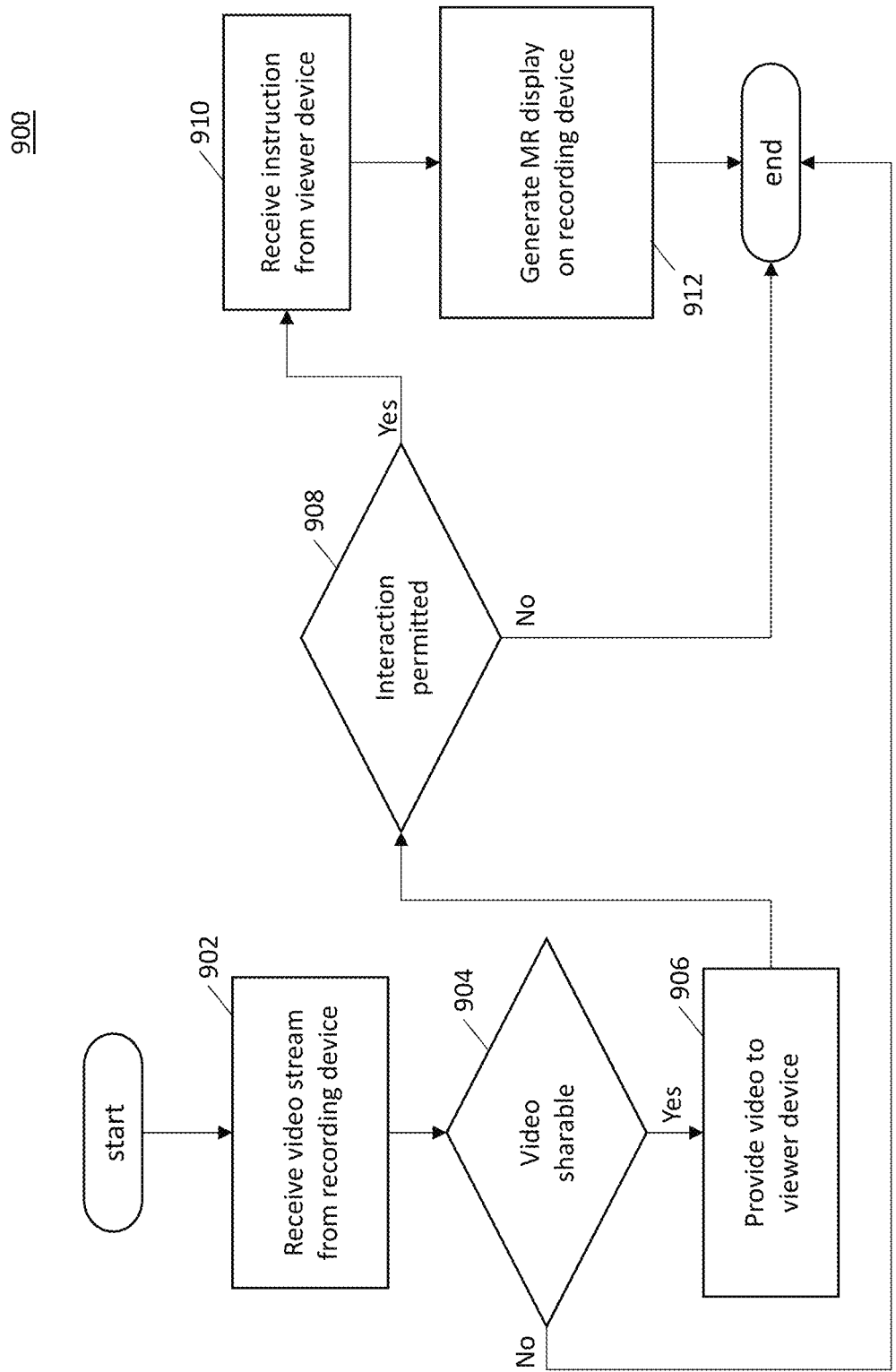
FIG. 9 is a flow diagram of a process for generating a graphical user interface on a recording device in accordance with examples of the present disclosure.

FIG. 9 shows a flow diagram of a process 900 for content sharing according to further examples of the present disclosure. The process 900 may be performed by one or more of the processors (e.g., processor 146) associated with system 100. The process 900 may start receiving a video stream from a recording device, as shown in block 902. The video stream may be received live as the recording device is recording the video. The system 100 may determine whether the video is sharable, as shown in block 904. If the video is sharable, the video may be provided to a requesting viewer device, as shown in block 903, assuming the video matches a query from the viewer device. In some examples, the viewer may wish to interact with the recorder, such as to direct the recording of the video and/or to request additional content. In some such examples, the system 100 may determine by accessing the interaction level permissions associated with the specific recording device or user, whether interaction(s) are permitted, as shown in block 908. In some embodiments, if it is determined that interaction is permitted, the system further determines the type(s) of interactions permitted—e.g., receiving viewer commands and/or granting of partial of full control remotely to the viewer device. If interactions are permitted, the process proceeds to block 910 in which instructions (e.g., to direct the recorder to do something or to take control of the recording device) are received from the viewer device. The instructions may be presented to the recorder, as shown in block 912, for example by voice or text command, by generating a mixed reality display (e.g., with instructions overlaid onto the video) or other display of the instructions any other suitable means for communicating the instructions to the recording device.

FIG. 10 shows exemplary data structures that can be used to implement the database component 153 of the system 100. The permissions database 1100 may include any suitable number of data elements 1102 for defining user permissions associated with the users (e.g., recording users and/or viewer users) of system 100. In the example in FIG. 10, the permission database 1100 include a first data element 1102-1, shown here as R_Device_ID table 1112. The table 1112 may be implemented as an array or table that stores a unique identifier (e.g., in alphanumeric, hexadecimal, integer, or floating-point format) for each of the recording user devices associated with system 100. Each unique recording device is assigned a unique recording device ID, as shown by elements 1113-1 through 1113-n. The permissions database 1100 may include a second data element 1102-2, shown here as R_User_ID table 1114. The table 1114 may be implemented as an array or table that stores a unique identifier (e.g., in alphanumeric, hexadecimal, integer, or floating-point format) for each of the recording users associated with system 100. Each unique recording user may be assigned a unique recording user ID, as shown by elements 1115-1 through 1115-m, for example at the time a user profile is generated for a new user of the system. As shown, the tables 1112 and 1114 may be linked or related to define relationship(s) between recording users and recording devices. For example, one or more of the users listed in table 1114 may be associated with one or more of the recording user devices listed in table 1112. In some examples, a single user listed in table 1114 may be associated with multiple recording devices listed in table 1112 or vice versa.

The permissions database 1100 may include one or more data elements that define the permissions associated with the recording users and/or devices of system 100. For example, the third data element 1102-3, shown here as CS_Perm table 1120, may store the content sharing permissions for each of the recording users and/or recording devices listed in tables 1112 and 1114. The content sharing permission table 1120 may include a plurality of table fields or elements 1123-1 through 1123-j, some or each of which may be implemented as arrays or table structures. For example, the individual fields of the higher level content sharing permission table 1120 may define the different types of content sharing permissions, e.g., location as shown in table 1122, time as shown in table 1124, event category (e.g., entertainment, which may be further sub-categorized as sporting, theater, concert, etc., a professional or educational event, a personal event), event type (e.g., live, pre-recorded, free, admission-based, etc.), and others. One or more of the sub-tables (e.g., tables 1122, 1124) of the higher level content sharing permission table 1120 may be linked, in some embodiments, to enable users to define permissions with greater number of control. For example, the location and time tables 1122 and 1124 may be linked so that a recording user may enable sharing of content in certain locations (e.g., at home, or at school/work) only at certain times (e.g., during daytime hours, or excluding certain times or dates such as during the evening or during a special event at work or school, such as during exams). A great amount of control for configuring one's profile may thus be provided to the recording users to only permit sharing of content when desired.

The permissions database 1100 may include one or more data elements that define the interaction profiles associated with the recording users and/or devices of system 100. For example, the fourth data element 1102-4 of table 1100, shown here as Int_Perm table 1130, may store the interaction level permissions for each of the recording users and/or recording devices listed in tables 1112 and 1114. Similar to table 1120, the interaction profiles table 1130 may include any suitable number of table fields or elements 1133-1 through 1123-k, some or each of which may be implemented themselves as arrays or table structures. Examples of sub-tables that may be included in the table 1130 may be a table that defines, for each unique recording device or recorder user, permissions for different types of interactions such as receiving visual commands (e.g., via a display of the recording device), voice commands (e.g., via a speaker of the recording device), granting full or limited control of the recording device to the viewer user (e.g., control to point the recording device in a viewing direction desired by the viewer user during a live recording), etc. A variety of other interaction level permissions may be predefined by the recording user, which similar to the content-sharing permissions, may be further refined based on time of day, specific date, location, event category or type, and so on.

In some embodiments, a method of content sharing may involve receiving first user-generated content from a first recording device and second user-generated content from a second recording device. The first user-generated content and the second user-generated content may be associated with a same event or with substantially the same date and time or location. The method may further involve determining whether the first user-generated content and the second user-generated content are sharable based on content-sharing permissions associated with the respective one of the first and second recording devices. If the first user-generated content and the second user-generated content are sharable, the method may involve producing composite content about the same event, date and time or location based on the first and second user-generated contents and providing the composite content to a viewer device, that may have queried the content-sharing database about the particular event, date and time or location.

Figure 11:
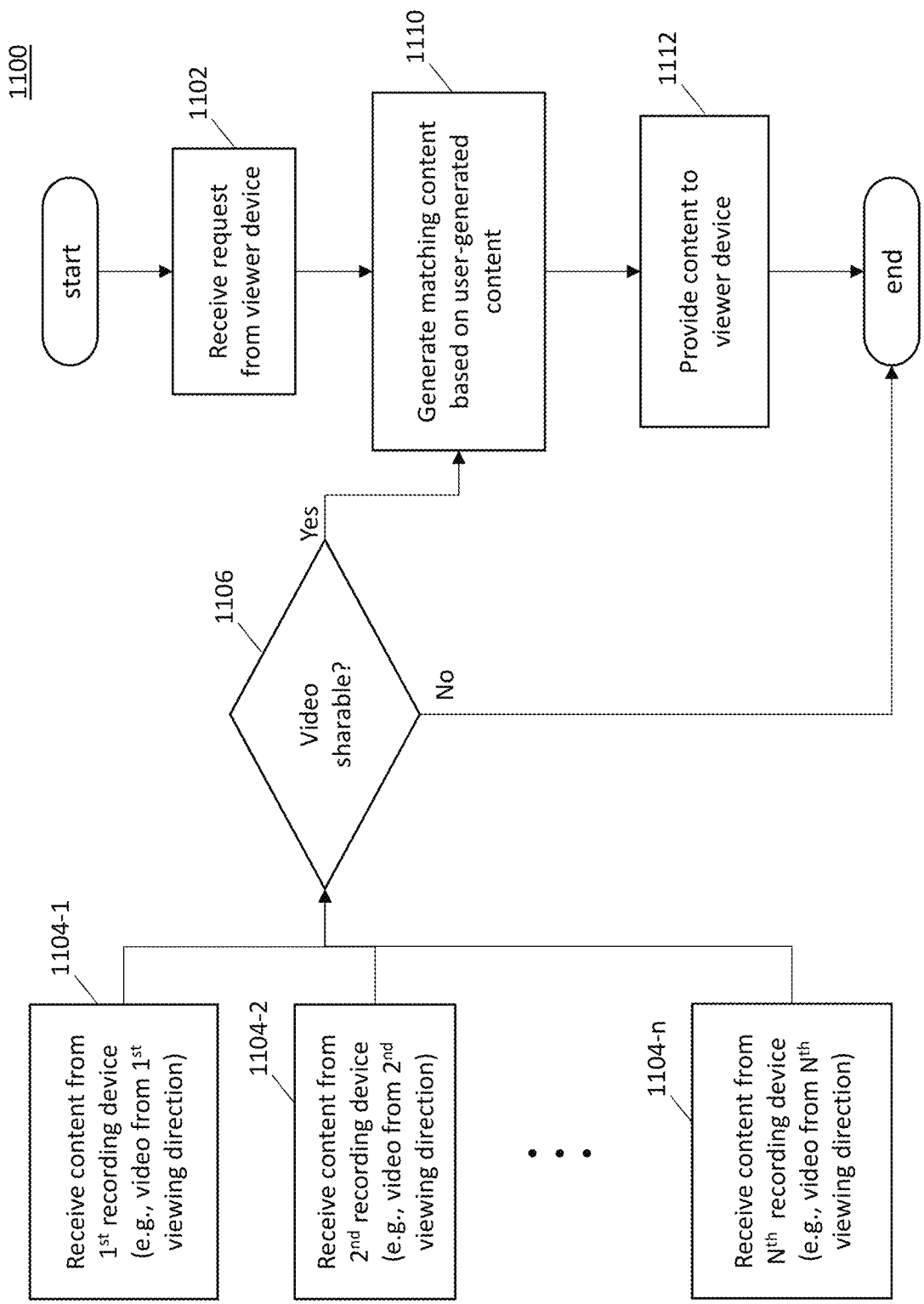
FIG. 11 is a flow diagram of a process for generating matching content in part from user-acquired content in accordance with the principles of the present disclosure.

FIG. 11 shows a flow diagram of an example process 1100 for generating content based on user-acquired content in accordance with the present disclosure. The process 1100 may be performed by one or more of the processors (e.g., processor 146) associated with system 100. The process 1100 includes receiving a request (e.g., a search query) from a viewer device, as shown in block 1102. For example, a viewer user may search for a certain type of content (e.g., a sporting event, a concert, a geographic location, a restaurant). In some examples, the request at block 1102 may be received via a user interface of the type describes with reference to FIG. 6. The processor (e.g., processor 146) may receive, e.g., via the network 132, user-acquired content from one or more recording devices. For example, the processor may receive content from a $1^{st}$ recording device as shown in block 1104-1, content from a $2^{nd}$ recording device as shown in block 1104-2, content from a $3^{rd}$ recording device and so on. The processor may receive user-acquired content from any number of recording devices such as n recording devices as shown in block 1104-n. The content received from one or more of the recording devices may be content associated with the same event. For example, the content from devices 1 through n may be videos recorded by different users or recording devices from different viewing angles at the event. In some examples, some of the content associated with the same event may be video, while other content may be non-video but may be still photography or contain other information such as information about the event (e.g., pricing, commentary, predictions, or any information about the event or participants in the event). For all content received at blocks 1104-1 through 1104-n, the content item may be analyzed and tagged (e.g., by processor 146) for sharing in accordance with the permissions defined in the user profile database (e.g., database 153). For each content item, the processor (e.g., processor 146) may determine whether the content is sharable, e.g., as shown in block 1106. If the processor 146 determines that none of the content items are sharable based on the permissions defined for the respective users or recording devices, the process 1100 terminates.

If one or more of the content items are determined to be sharable at block 1106, the process proceeds to block 1110 where content matching the viewer user query is generated and to block 1112 in which the system-generated matching content is provided to the viewer user device. In some examples, the matching content may be streaming video from multiple viewing angles, each of which may be provided in a separate display window on the viewer user's display 124. In some examples, the matching content may be a composite (e.g., mixed reality or virtual reality content) generated from two or more different content items. For example a composite panoramic view of the event may be constructed by the processor 146 from videos recorded from different viewing angles and displayed, as panoramic displays, to the viewer user. In some examples, a composite video may be generated and a given viewing direction displayed to the viewer user, while giving the user the option to pan through a larger viewing angle that may be available based upon the source content. Video content may be enhanced further from additional user-recorded content determined to be sharable, such as with commentary, labels and tags identifying objects or individuals in the video, to further enhance the viewer user experience. In the case of live streaming, the generating of matching content at block 1110 may occur in real time as the live content is streamed onto the network 132 such that the system-generated content based in live streaming content may be readily available for sharing with any number of requesting viewer users. In other examples, the user-recorded content may be stored for later use in generating matching content to fit specific viewer user requests. Examples of advantages of systems described herein may include facilitating users ability to search and find videos based on time and location data of a recording device throughout the video; increased ability of users viewing live content to interact with or control the user/device providing the video content; providing a platform for users to share, search, and view video content including mixed reality video content; increased ability of users providing live content to receive and response to user commands including integration between a video sharing platform and augmented reality devices; analysis of video content and objects therein to enhance the content displayed to a viewer and extract information from the video content; and generally provide a video sharing platform with abilities and features for integrating with mixed reality technologies. Users of the systems described herein are better able to connect and share video content with each other in an interactive environment, and can more fully experience and enjoy video content of a variety of real-life events.

The advantages described herein are provided to facilitate an appreciation of examples of the described technology. It is to be understood that examples of the described technology may not exhibit all, or even any, of the described advantages. From the foregoing, it will be appreciated that, although specific embodiments have been described herein for purposes of illustration, various modifications may be made while remaining within the scope of the claimed technology.

Examples described herein may refer to various components as "coupled" or signals as being "sent/transmitted to" or "received/retrieved from" certain components. It is to be understood that in some examples the components are directly coupled one to another, while in other examples the components are coupled with intervening components or networks disposed between them. Similarly, a signal may be provided directly to and/or received directly from the recited components without intervening components, but also may be provided to and/or received from the certain components through intervening components.

It should be noted that while the present disclosure focuses on systems and feature for sharing video content, portions of the system and methods in this disclosure can be used in many other applications. As such, the discussion of any particular embodiment is meant as illustrative only. In addition, while the present disclosure describes a variety of systems and features in combination with mixed reality technology and devices, any system or method not necessarily requiring a mixed reality device or technology can be implemented without incorporation of the mixed reality devices or technology.

While embodiments of the invention, such as certain functions, may be described as being performed on a single device, embodiments of the invention can also be practiced in distributed environments where functions or modules are shared among disparate processing devices, which are linked through a communications network, such as, for example, a Local Area Network (LAN), Wide Area Network (WAN), the Internet, Bluetooth, and Zigbee. In a distributed computing environment, program modules may be located in both local and remote memory storage devices.

Embodiments of the invention may be stored or distributed on tangible (or non-transitory) computer-readable media, including magnetically or optically readable computer discs, cloud servers, hard-wired or preprogrammed chips (e.g., EEPROM semiconductor chips), nanotechnology memory, biological memory, or other data storage media. Alternatively or additionally, computer implemented instructions, data structures, screen displays, and other data under aspects of embodiments of the invention may be distributed over the Internet and via cloud computing networks or on any analog or digital network (packet switched, circuit switched, or other scheme). The non-transitory computer-readable medium may store computer data, which data may include computer program code that is executable by a computer, in machine readable form. By way of example, a computer readable medium may comprise computer readable storage media, for tangible or fixed storage of data, or communication media for transient interpretation of code-containing signals. Non-transitory computer readable media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Non-transitory computer-readable media includes, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Embodiments of the invention are described herein with reference to operational illustration of modules, engines, widgets, or the like having functional blocks to illustrate methods employed by content-sharing system. It will be understood that each of the modules, blocks, engines, widgets, and combinations thereof may be implemented by analog or digital hardware and computer program instructions. The computer program instructions may be provided to a processor of a general purpose computer, special purpose computer, application-specific integrated circuit (ASIC), or other programmable data processing apparatus such that the instructions, which execute via the processor of the computer or other programmable data processing apparatus, implements the functions/acts specified in the functional blocks of the flowcharts and/or the operational modules. In some embodiments, the methods illustrated by the functional blocks may occur out of the order noted in the operational illustration of the modules, engines, and/or widgets. For example, two blocks shown in succession may be executed substantially concurrently. Alternatively and/or additionally, the blocks may be executed in reverse order. A module of functional block may be implemented in any suitable combination of software, hardware, or firmware components that are specifically configured to perform or facilitate the processes, features, and/or functions described herein. A module may include sub-modules or engines. Software components of a module may be stored on a computer readable medium. Modules may be integral to one or more computers or servers, or be loaded and executed by one or more computers or servers. One or more modules may be grouped into an application.

In methodologies directly or indirectly set forth herein, various steps and operations are described in one possible order of operation, but those skilled in the art will recognize the steps and operations may be rearranged, replaced or eliminated without necessarily departing from the spirit and scope of this disclosure. It is intended that all matter contained in the above descriptions or shown in the accompanying drawings shall be interpreted as illustrative only and not limiting. Changes in detail or structure may be made without departing from the spirit of the disclosure.

What is claimed is:

1. A system for sharing user-generated content, comprising:
   a database in which a plurality of videos are stored, the plurality of videos comprising at least one of a first video captured by a first video recording device having a first point of view of a given geographic location and a second video captured by a second video recording device having a second point of view of the given geographic location, the second point of view being different from the first point of view; and
   a computing device communicatively coupled to the database and including a processor and memory comprising executable instructions, which when executed by the processor cause the processor to:
      obtain the first and second videos,
      determine whether the first and second videos are permitted to be shared with people other than people associated with the first and second video recording devices,
      create a third video by combining the first and second videos, the third video comprising content of the given geographic location observable from the first and second points of views;
      construct a virtual reality environment using the third video;
      overlaying information onto the virtual reality environment that was extracted from a fourth video that is was not used to generated the virtual reality environment; and
      cause the virtual reality environment with the overlaid information to be presented on a display device.

2. The system of claim 1, wherein a sharing permission of each said first and second videos is determined based on (i) a location of the first or second video recording device at the time of recording the first or second video or (ii) a time when the first or second video was being recorded.

3. The system of claim 1, wherein the processor is further caused to receive a request for desired information about a geographic location, and search a World Wide Web for media content acquired while at least one recording device was located at the geographic location, the media content being used to construct or enhance the virtual reality environment.

4. The system of claim 1, wherein the information overlaid onto the virtual reality environment comprises at least one of an advertisement, a comment, and a user rating.

5. The system of claim 1, wherein at least one of the first video, second video and fourth video was recorded by a member of a general public using a personal recording device while at the given location.

6. The system of claim 5, wherein at least one of the first, second and fourth videos is found by the processor via an analysis of results from a keyword search using a global search engine.

7. The system of claim 6, wherein at least one of the first, second and fourth videos (i) is posted on a website owned by a company other than a company owning the system for sharing user-generated content and (ii) is visible to a general public.

8. The system of claim 7, wherein the website comprises an online social media site or an online video-sharing site.

9. The system of claim 1, wherein the first and second videos comprise 2D videos, and the third video comprises a 3D video created by combing the 2D videos.

10. The system of claim 1, wherein the first and second videos comprise 3D videos, and the third video comprises a 3D video created by combining the 3D videos.

11. The system of claim 1, wherein the first video comprises a 2D video, the second video comprises a first 3D video, and the third video comprises a second 3D video created using the 2D video and the first 3D video.

12. The system of claim 1, wherein the processor is further caused to manage the virtual reality environment of a web service provider by:
   obtaining a plurality of fifth videos that were recorded by a plurality of personal recording devices from different viewpoints while in the possession of individuals who are physically present at the given geographic location;
   combining the plurality of fifth videos to produce a sixth video; and
   modifying at least one virtual object in the virtual reality environment based on characteristics of a real-world object in the sixth video.

13. The system of claim 12, wherein the individuals are customers of the web service provider.

14. The system of claim 12, wherein the individual are not customers of the web service provider.

15. The system of claim 12, wherein the processor is further caused to determine whether each of the plurality of fifth videos is permitted to be shared with others based on content of a respective user profile of a plurality of user profiles, prior to said combining.

16. The system of claim 12, wherein the processor is further caused to generate at least one new virtual object based on content of the sixth video, and add the at least one new virtual object to the virtual reality environment.

* * * * *